US010618044B1

(12) United States Patent
Petrie, Jr.

(10) Patent No.: US 10,618,044 B1
(45) Date of Patent: Apr. 14, 2020

(54) CENTRIFUGE TUBE ASSEMBLY

(71) Applicant: Thomas R. Petrie, Jr., Sugar Hill, GA (US)

(72) Inventor: Thomas R. Petrie, Jr., Sugar Hill, GA (US)

( * ) Notice: Subject to any disclaimer, the term of this patent is extended or adjusted under 35 U.S.C. 154(b) by 0 days.

(21) Appl. No.: 16/029,843

(22) Filed: Jul. 9, 2018

Related U.S. Application Data

(60) Division of application No. 15/656,123, filed on Jul. 21, 2017, now Pat. No. 10,040,064, which is a continuation-in-part of application No. 14/680,707, filed on Apr. 7, 2015, now Pat. No. 9,718,003.

(51) Int. Cl.
*G01N 1/00* (2006.01)
*B01L 3/00* (2006.01)

(52) U.S. Cl.
CPC ......... *B01L 3/5021* (2013.01); *B01L 3/50825* (2013.01); *B01L 3/50853* (2013.01); *B01L 2200/026* (2013.01); *B01L 2300/042* (2013.01); *B01L 2300/12* (2013.01)

(58) Field of Classification Search
CPC ........................................................ G01N 1/00
See application file for complete search history.

(56) References Cited

U.S. PATENT DOCUMENTS

| | | | | |
|---|---|---|---|---|
| 6,835,353 | B2 | 12/2004 | Smith et al. | |
| 7,179,391 | B2 | 2/2007 | Leach et al. | |
| 7,829,022 | B1 | 11/2010 | Lich | |
| 7,976,797 | B2 | 7/2011 | Chun | |
| 8,313,954 | B2 * | 11/2012 | Leach .................. | A61M 1/029 210/513 |

* cited by examiner

*Primary Examiner* — Jyoti Nagpaul
(74) *Attorney, Agent, or Firm* — Dennis L. Thomte; Thomte Patent Law Office LLC

(57) ABSTRACT

A centrifuge tube assembly which allows for a single centrifuge cycle and which permits the aspiration of fluids from multiple levels with the centrifuge tube assembly. The centrifuge tube assembly includes a vertically disposed outer containment tube having a closed lower end and an open upper end with the open upper end being closed by a cap. An elongated inner tube extends downwardly through the cap and into the interior of the outer containment tube. A generally cone-shaped disk assembly is slidably mounted on the inner tube to create a chamber above the disk assembly. An O-ring is mounted on the lower end of the disk assembly which is in yieldable engagement with the inner tube. A flapper valve is positioned in the upper end of the disk assembly. The flapper valve has a plurality of slits formed therein.

3 Claims, 23 Drawing Sheets

CENTRIFUGE TUBE ASSEMBLY

CROSS REFERENCE TO RELATED APPLICATION

This is a Divisional Application of application Ser. No. 15/656,123 filed Jul. 21, 2017, entitled CENTRIFUGE TUBE ASSEMBLY, which is a Continuation-in-Part Application of application Ser. No. 14/680,707 filed Apr. 7, 2015, entitled CENTRIFUGE TUBE ASSEMBLY AND METHOD OF USING THE SAME.

BACKGROUND OF THE INVENTION

Field of the Invention

This invention relates to an improved centrifuge tube assembly which allows for a single centrifugation cycle and the aspiration of fluids from multiple levels within the centrifuge tube assembly. More particularly, the device may be used for the aspiration, separation, isolation and extraction of discrete layers in a liquid suspension. Even more particularly, this invention relates to an improved centrifuge tube assembly which includes a disk structure which is vertically slidably movable on the inner tube of the centrifuge tube assembly to create a chamber area within the outer tube thereof above the inner tube port of the centrifuge assembly and the packed red cells in the assembly.

Description of the Related Art

Various medical procedures utilize platelet-rich blood plasma. The blood product is effective due to its growth promoting features, which are proven to assist greatly in wound healing and bone regeneration. Over the last decade, many devices have been developed which allow a clinician to isolate and concentrate the platelet component from a whole blood sample including that described in U.S. Pat. No. 7,829,022 which uses a dual centrifugal cycle process. Alternate devices have been developed which employ a single centrifugation cycle including that described in U.S. Pat. Nos. 7,976,796 and 7,179,391.

Although the devices of the above-identified patents have experienced some commercial success, it is believed that the devices have certain drawbacks or disadvantages. For example, none of the prior art devices are capable of collecting the target fluid (platelet rich plasma) with a single aspiration after a single centrifugation cycle. Further, none of the prior art devices have an integrated locking mechanism to secure the inner tube at any targeted component locations from 15 ml to 40 ml. None of the prior art devices incorporate an O-ring to introduce a tactical feedback, similar to the dispense/aspirating action of a syringe, and containment seal. The tubes of U.S. Pat. Nos. 7,976,796 and 7,179,391 are prone to kinking. The device of the co-pending application identified above eliminated the need of the integral flexible tube employed in U.S. Pat. Nos. 7,976,796 and 7,179,391. The device of the co-pending application eliminated the need for a second spin requirement such as employed in U.S. Pat. No. 7,829,022. The feature of the co-pending application which is not found in the listed US Patents is a manual adjustable aspiration tube to visually align the target layer of choice. The device of the co-pending application features an aspiration tube design that has a dimensional relationship between the visual indicator and aspiration port to maintain an RBC and Buffy coat ratio that allows a range of volume choices. The device of the co-pending application eliminated the need to remove or isolate the RBC prior to PRP aspiration, a feature not found in other PRP devices. The device of the co-pending application allows a min/max PRP volume selection from 3 ml to 30 ml, a feature not found in other devices. The device of the co-pending application integrates a single centrifugation, a single aspiration, a single syringe and a single biohazard disposable to deliver an end product, which is not possible in any prior art device. The device of the co-pending application truly represents an improvement in the art. The instant invention represents a further improvement in the art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A centrifuge tube assembly is disclosed which includes an elongated and vertically disposed outer containment tube having an open upper end and a closed lower end. The outer containment tube is comprised of a transparent material. The outer containment tube has a vertically disposed cylindrical post centrally positioned therein at the lower end thereof with the post extending upwardly from the lower end of the outer containment tube. The cylindrical post has an elongated and vertically disposed keyway formed therein which extends inwardly thereinto between the lower and the upper ends thereof.

The centrifuge tube assembly of this invention also includes an elongated and vertically disposed inner tube, having an open lower end and an open upper end which is positioned in the outer containment tube. The lower end of the inner tube is vertically slidably mounted on the cylindrical post. The inner tube has an alignment key therein at its lower end which is slidably received by the keyway in the cylindrical post to prevent rotation of the inner tube with respect to the cylindrical post and the outer containment tube.

The inner tube has an aspiration port formed therein above the lower end. The inner tube also has an annular disk stop formed therein above the aspiration port. The outer tube also has an imprinted millimeter line thereon. A cup-shaped cap is selectively removably mounted on the upper end of the outer containment tube. The cup-shaped cap has a filtered vent port which is in communication with the upper interior containment tube. The inner tube is selectively slidably extended upwardly through the cap whereby the upper end of the inner tube is positioned above the cap. A seal means is provided in the cap between the cap and the inner tube to prevent fluids from passing outwardly from the interior of the outer containment tube around the inner tube.

A locking assembly is associated with the cap for selectively locking the inner tube in various vertical positions with respect to the outer containment tube. The upper end of the inner tube has a male luer thereon. A female luer cap is provided for selective engagement with the male luer to close the male luer. The method of using the centrifuge tube assembly is also described.

A generally cone-shaped disk assembly, having upper and lower ends, is vertically slidably mounted on the inner tube to create a chamber which captures blood components at their fractionation level. The disk assembly includes a cone-shaped flapper valve having a plurality of slits formed therein.

It is therefore a principal object of the invention to provide an improved centrifuge tube assembly and the method of using the same.

A further object of the invention is to provide a device of the type described wherein the device may serve both as a collection vessel and a tube for the centrifugation of fluids into their discreet components.

A further object of the invention is to provide a device of the type described which includes a single port at the top of the device which may be used to fill and aspirate fluid, pre-centrifugation and post-centrifugation therefrom.

Yet another object of the invention is to provide a device of the type described wherein the clinician has complete control over the concentration and volume of the end product.

Still another object of the invention is to provide a centrifuge device assembly which may be used with any centrifuge machine capable of at least 1900 rcf and 85-50 ml swing out rotor.

A further object of the invention is to provide a centrifuge tube assembly of the type described which provides the most cost effective solution specifically designed for the concentration of platelets, stem cells or adipose tissue.

A further object of the invention is to provide a centrifuge tube assembly having the ability to extract the blood component of choice after centrifugation.

A further object of the invention is to provide a centrifuge tube assembly in which the surfaces that interface with blood are constructed of a plastic material that is slippery and prevents the adhesion of platelets or other cells.

A further object of the invention is to provide a centrifuge tube assembly which includes a disk structure which is slidably movably mounted on an inner tube of the assembly to create a chamber area above the inner tube port and the packed red cells in the assembly.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
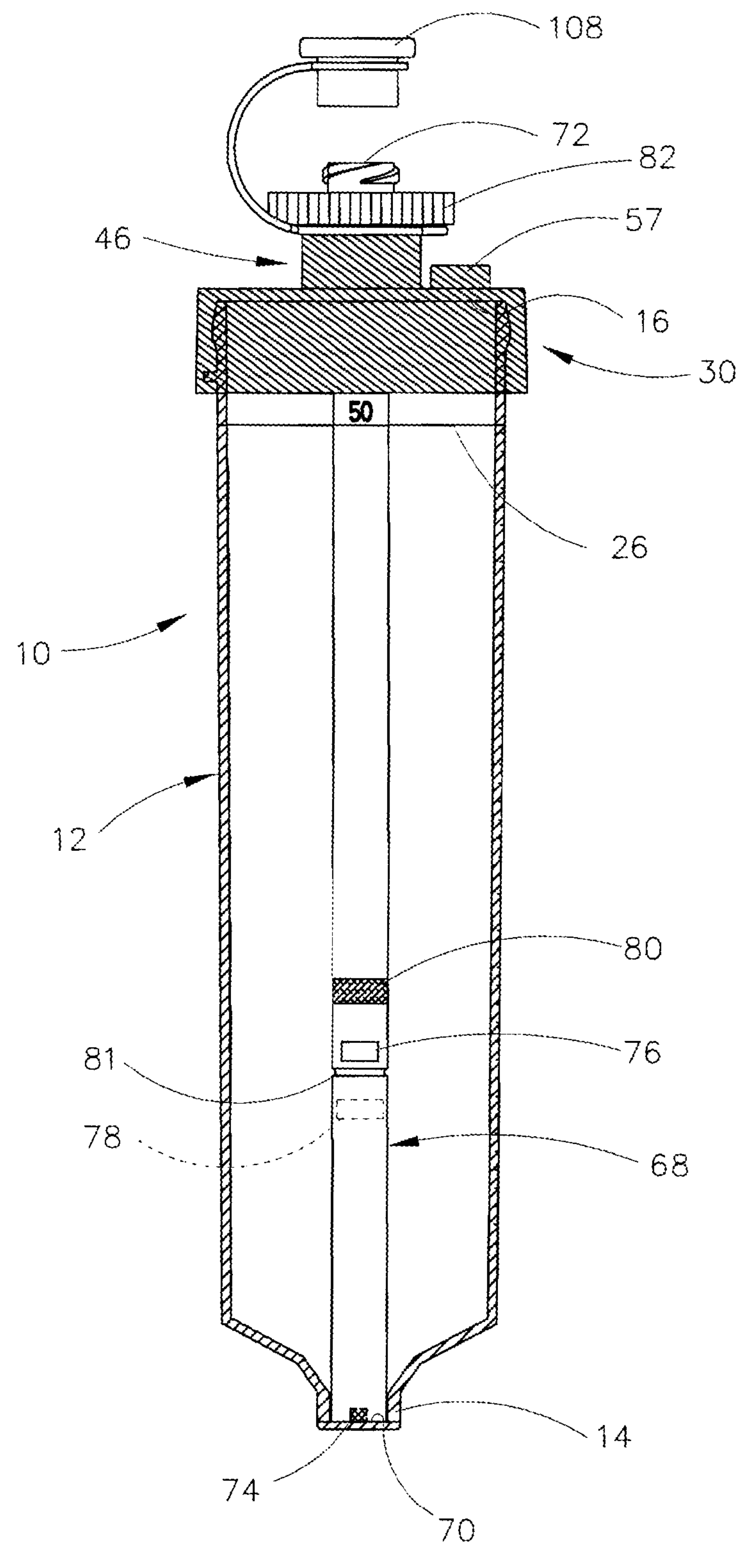
FIG. 1 is a partial sectional view of the centrifuge tube assembly of the co-pending application.
Figure 3:
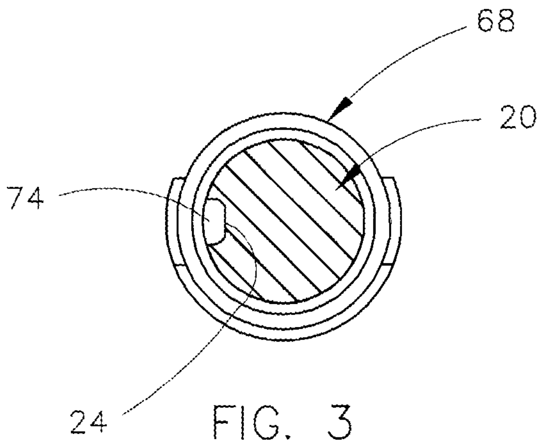
FIG. 3 is a bottom view of the inner tube of the centrifuge tube assembly of the co-pending application with the cylindrical post being shown in section.
Figure 2:
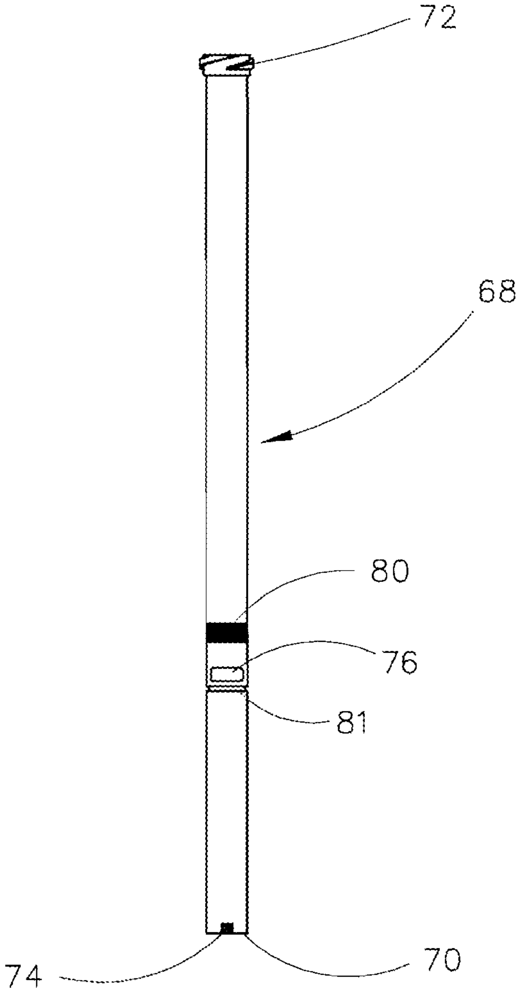
FIG. 2 is a side view of the inner tube of the centrifuge tube assembly of the co-pending application.
Figure 4:
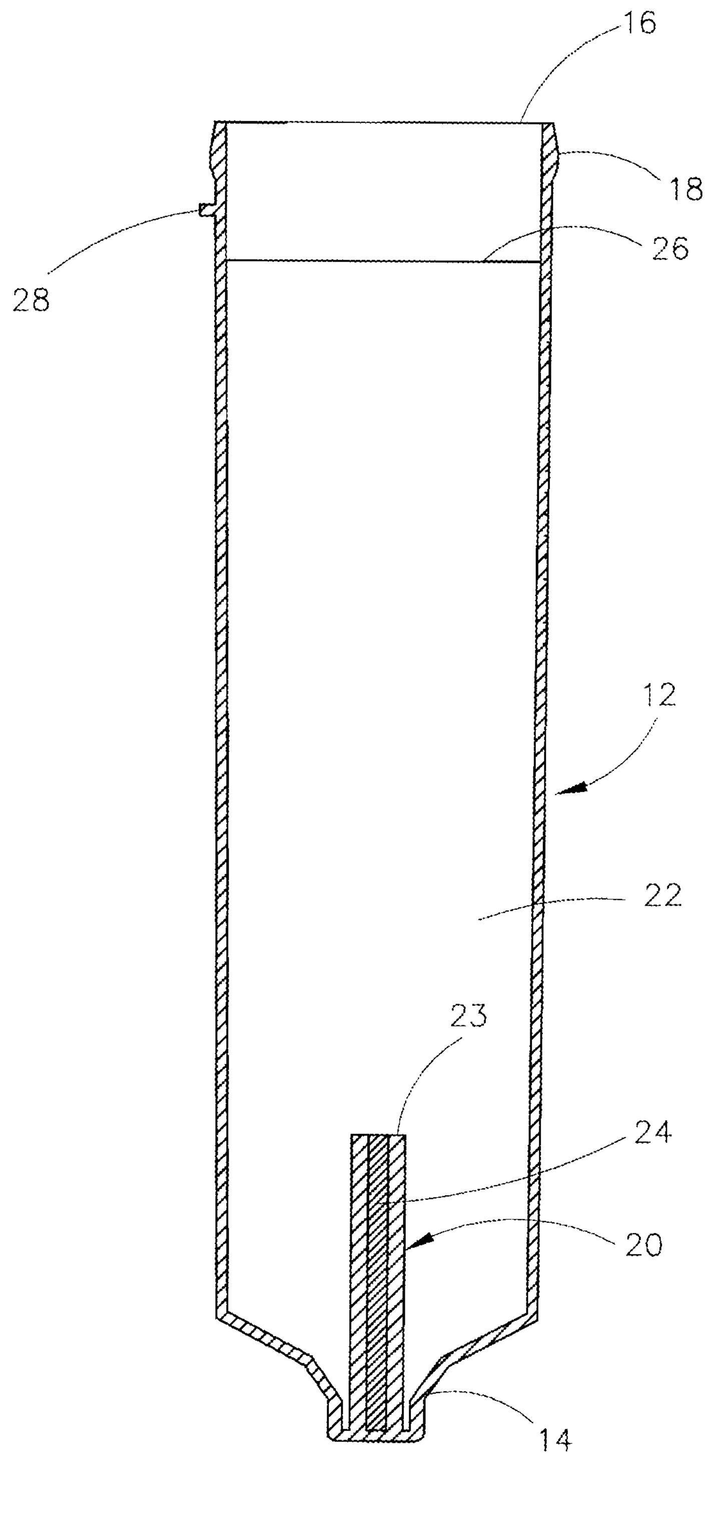
FIG. 4 is a sectional view of the outer containment tube of the centrifuge tube assembly of the co-pending application.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

FIGS. 1-20 are the drawings of the co-pending application. In those drawings, the numeral 10 refers generally to the centrifuge tube assembly of the co-pending application which will be referred to hereinafter as "assembly". Assembly 10 includes an outer containment tube 12 having a tapered and closed lower end 14 and an open upper end 16. The upper outer side of tube 12 has mating geometry in the form of a protruding annular bulge 18. An upstanding cylindrical post 20 is integrally formed with tube 12 and extends upwardly from lower end 14 into the interior 22 of tube 12. For purposes of description, post 20 will be described as having an upper end 23. A vertically disposed keyway or slot 24 is formed in post 20. Tube 12 also has a 50 mm line 26 imprinted thereon below the upper end 16. Tube 12 also has a stop 28 which protrudes laterally from the outer side of tube 12 below the upper end thereof.

Assembly 10 also includes a cup-shaped cap 30 having a cylindrical side wall portion 32 with an upper end 34, a lower end 36, an outer side 38 and an inner side 40. The upper inner side 40 of side wall portion 32 has an annular recessed portion 42 thereon. A horizontally disposed top wall portion 44 extends laterally inwardly from the upper end of side wall portion 32. A cylindrical throat or neck portion 46 extends upwardly from the inner end of top wall portion 44 and has an outer side 48 and an inner side 50 which define a central opening 52. Throat portion 46 has an annular recess or groove 54 formed therein at its upper end which receives an O-ring 56 therein. Top wall portion 44 has a filtered vent port 57 associated therewith. The side walls of central opening 52 have a pair of oppositely disposed chords 58 and 60 formed therein. The underside of top wall portion 44 has an annular wall 62 extending downwardly therefrom inwardly of the annular recessed portion 42.

The assembly 10 also includes an elongated inner tube 68 having an open lower end 70 and an open upper end 72 in the form of a male luer. Inner tube 68 has an anti-rotation key 74 formed thereon at its lower end which is configured to extend into the keyway 24 of post 20 as will be discussed in detail hereinafter.

Inner tube 68 has an aspiration port 76 formed therein above its lower end. Inner tube 68 also has an inside diameter stop 78 therein just below aspiration port 76. Inner tube 68 also has an imprinted black band 80 thereon above aspiration port 76. Inner tube 68 also has an undercut 81 formed therein below aspiration port 76.

The numeral 82 refers to an inner tube lock assembly. Assembly 82 includes a horizontally disposed and rotatable disk 84 having a central opening 86 extending therebetween. The wall surface around opening 86 has an annular channel 88 formed therein which has an O-ring 90 positioned therein. Assembly 82 includes a generally cylindrical and hollow body portion 92 which extends downwardly from disk 84. Body portion 92 has four radially spaced-apart and vertically disposed slits 94 formed therein. The lower end of body portion 92 has four radially spaced-apart inner tube lock tabs 96 extending horizontally outwardly therefrom. Body portion 92 has a pair of 180 degree spaced-apart chord tabs 98 formed therewith which extend outwardly from the outer surface of body portion 92. The O-ring 56 embraces body portion 92 above the slits 94.

Figure 5:
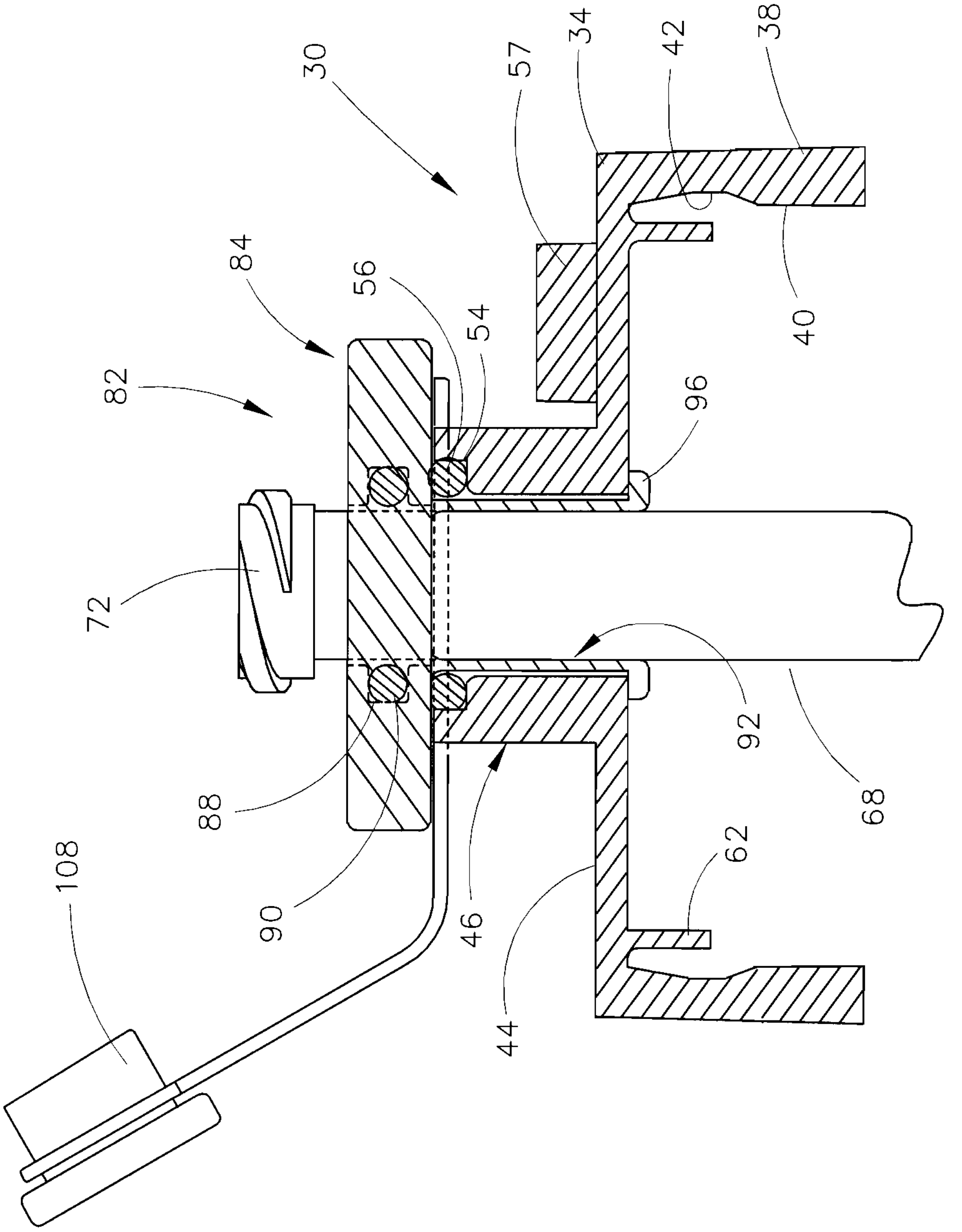
FIG. 5 is a partial sectional view of the cap and inner tube lock and their relationship with the inner tube of the centrifuge tube assembly of the co-pending application.
Figure 6:
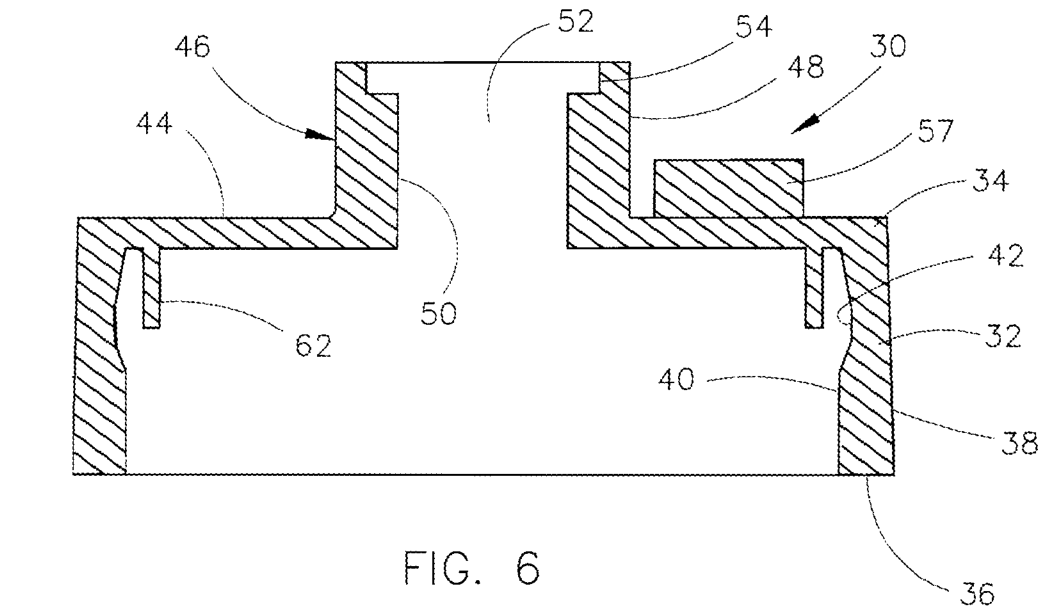
FIG. 6 is a sectional view of the cap of the centrifuge tube assembly of the co-pending application.
Figure 7:
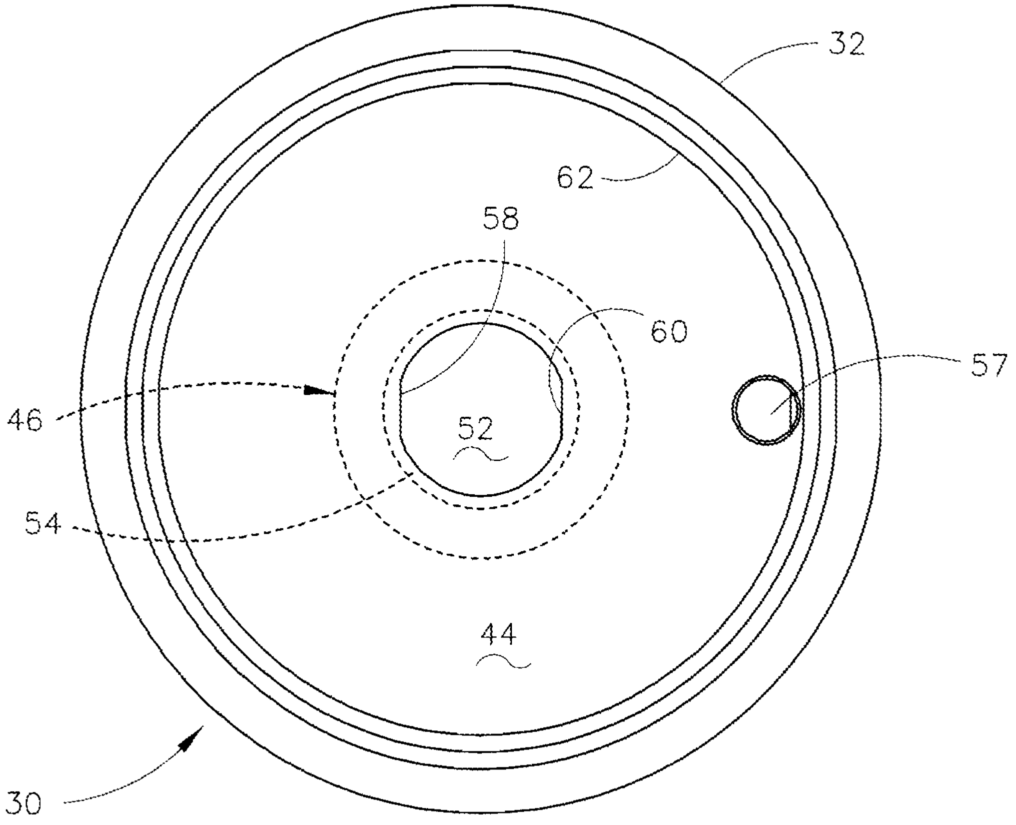
FIG. 7 is a bottom elevational view of the cap of the centrifuge tube assembly of the co-pending application.
Figure 9:
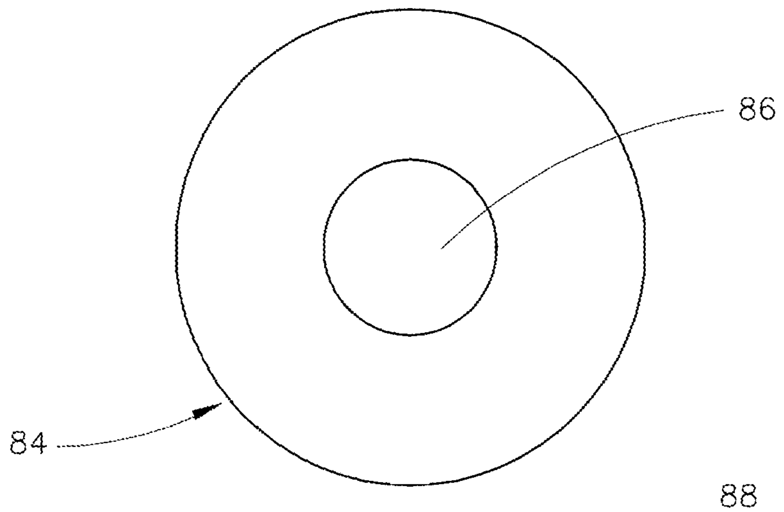
FIG. 9 is a top view of the disk of the inner tube lock mechanism of the co-pending application.
Figure 8:
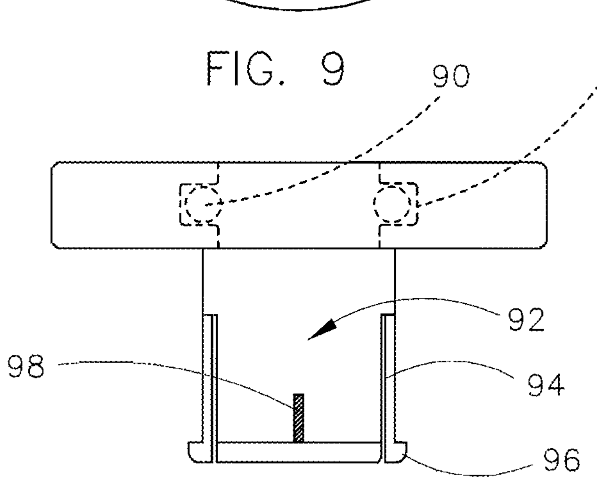
FIG. 8 is a top view of the inner tube lock mechanism of the centrifuge tube assembly of the co-pending application.
Figure 10:
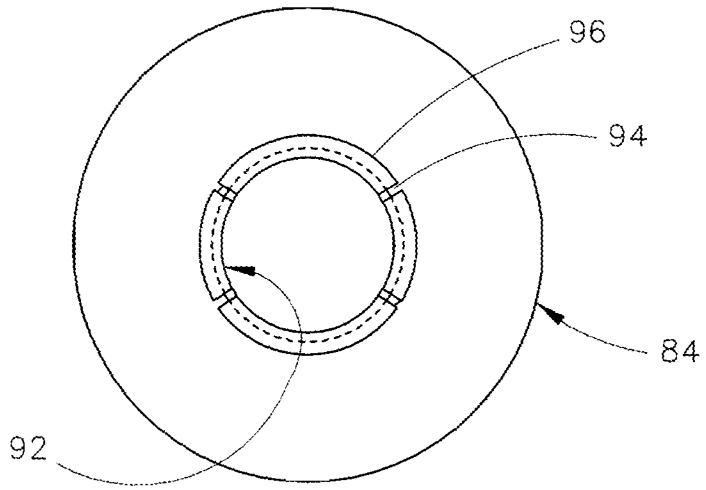
FIG. 10 is a bottom elevational view of the inner tube lock mechanism of the co-pending application.
Figure 11:
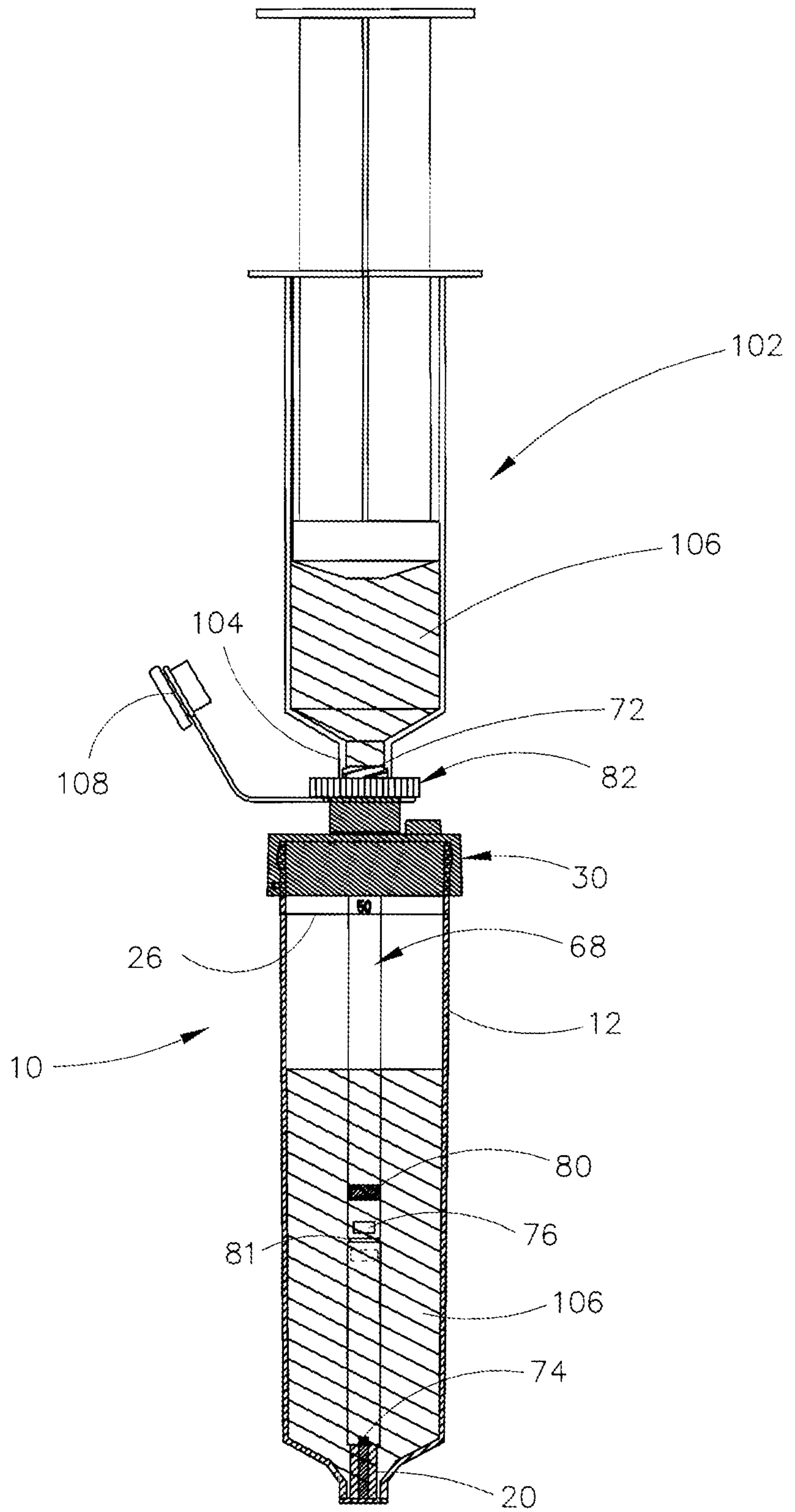
FIG. 11 is a partial sectional view illustrating the orientation and inter-connection between the outer containment tube, the inner tube and a syringe connected to a male luer at the upper end of the inner tube of the co-pending application.
Figure 12:
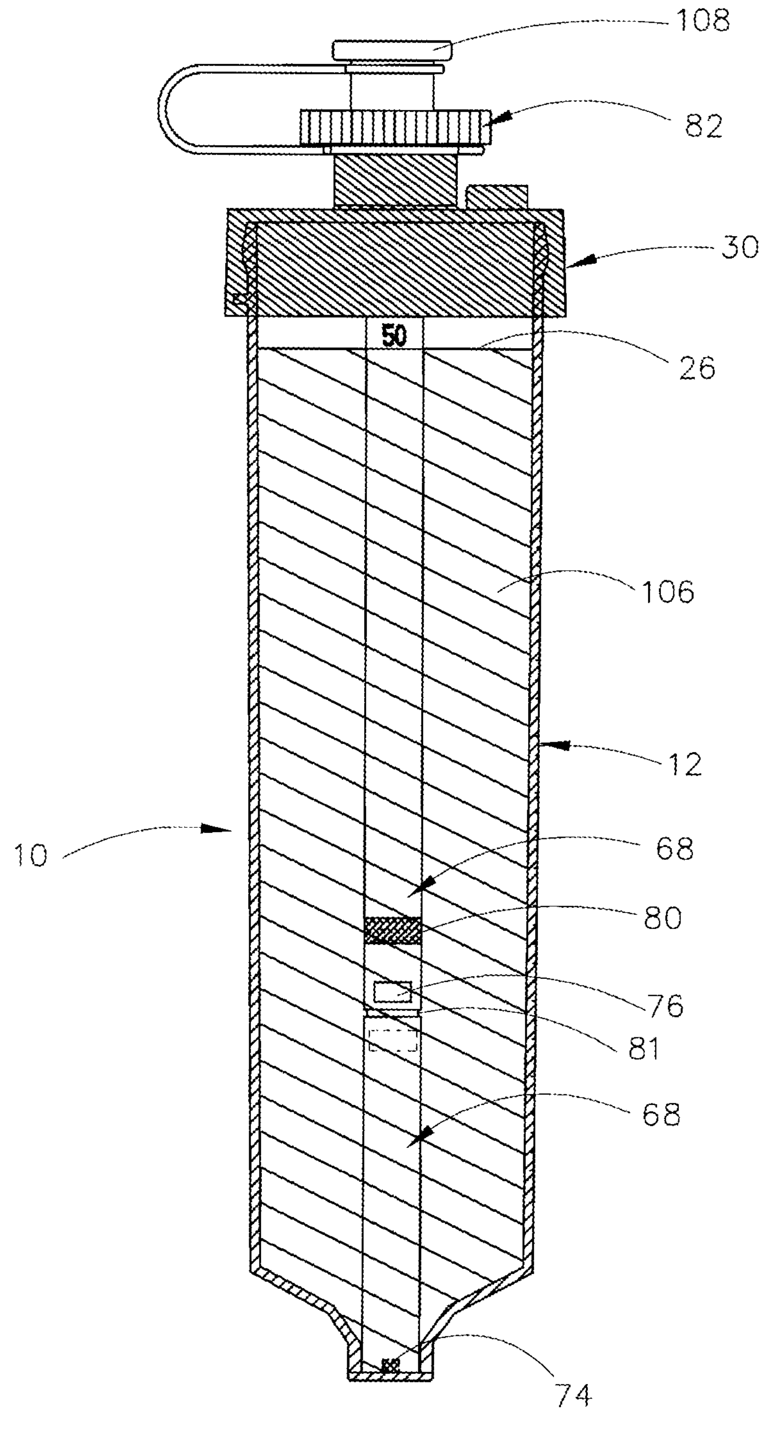
FIG. 12 is a sectional view of the centrifuge tube assembly and which illustrates a biohazard safety luer cap secured to the upper end of the inner tube during centrifugation of the co-pending application.
Figure 13:
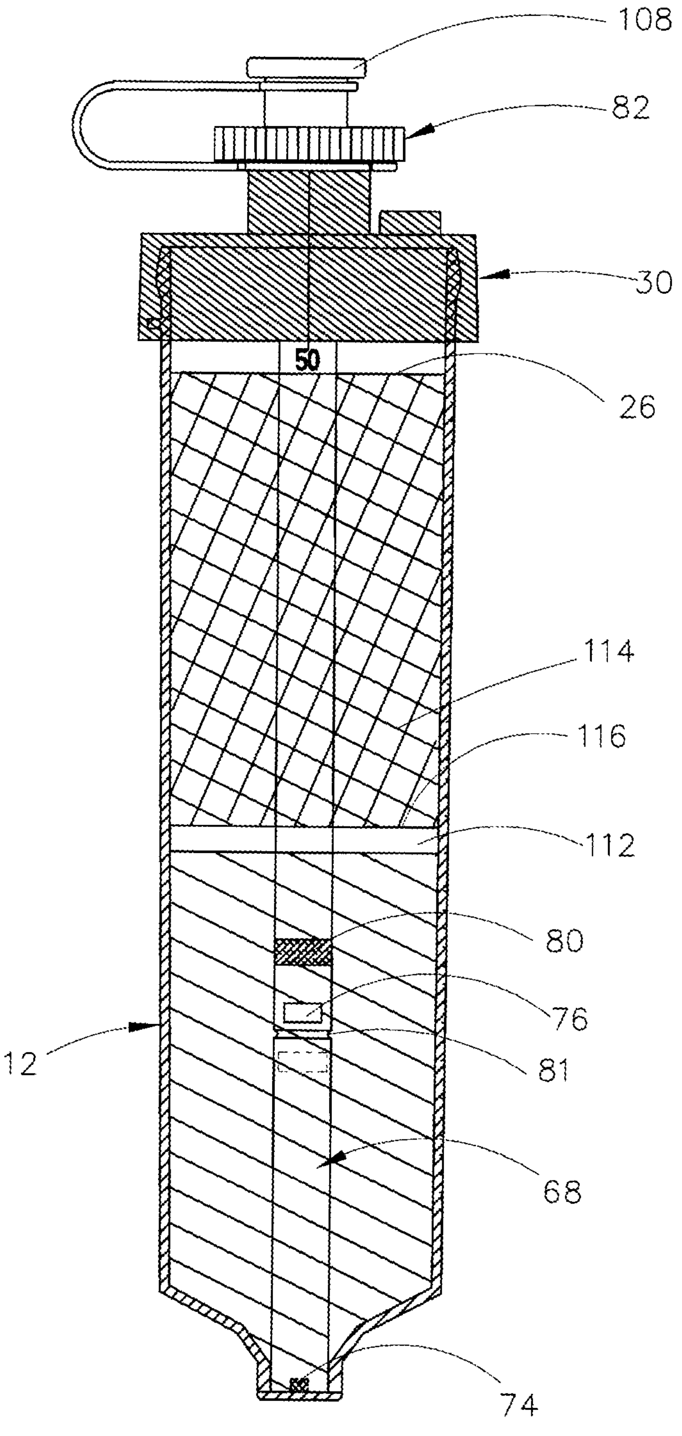
FIG. 13 is a sectional view of the transparent outer containment tube which permits a person to view the component's demarcation of plasma, red cells and buffy coat of the co-pending application.
Figure 14:
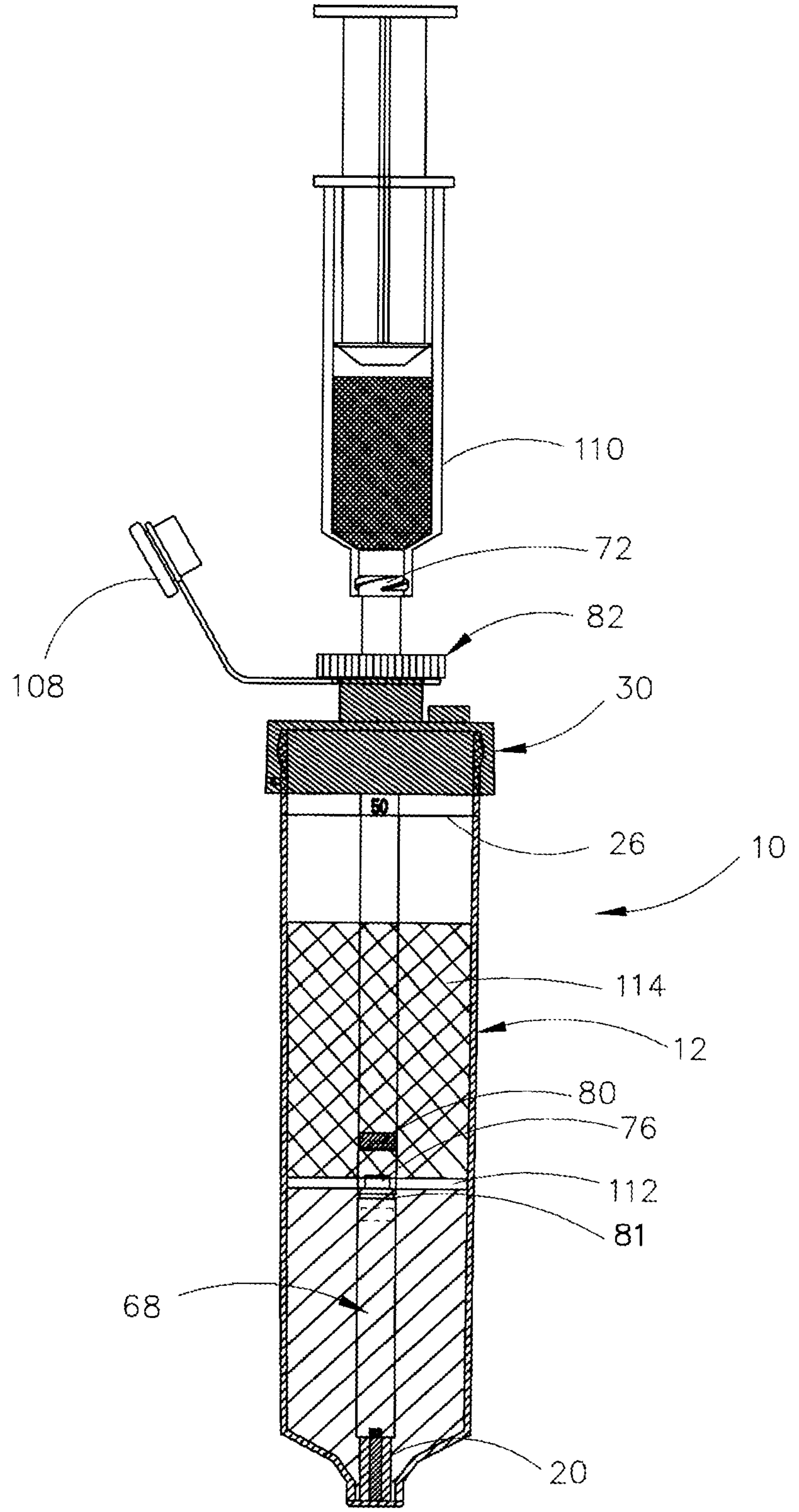
FIG. 14 is a partial sectional view illustrating the inner tube of the assembly being vertically raised for connection to a syringe of the co-pending application.
Figure 16:
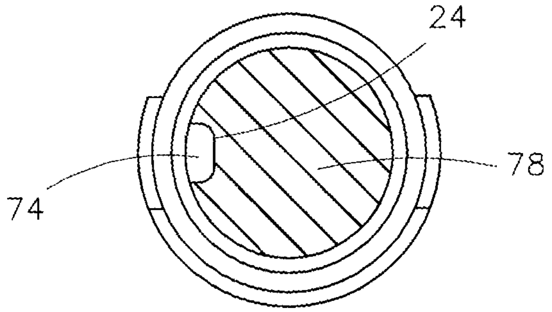
FIG. 16 is a bottom view of the modified inner tube of the co-pending application.

The inner tube lock assembly 82 is mounted on and in the cap 30 as follows. The inner tube lock assembly 82 is initially rotated with respect to cap 30 so that the chord tabs 98 are located at 90 degrees from the chords 58 and 60 in central opening 52 of throat 46 of cap 30. The body portion 92 of assembly 82 is then pushed downwardly through the central opening 52 in throat 46 of cap 30. The four slits 94 permit the body portion 92 to slightly collapse or spring out so that the body portion 92 may be completely inserted downwardly in the central opening 52 and then spring back so that the four inner tube lock tabs 96 are positioned below the top wall portion 44 of cap 30 as seen in FIG. 5.

The inner tube 68 is inserted downwardly into the tube 12 by inserting the inner tube 68 downwardly through central opening 86 in disk 84, and through body portion 92. The inner tube 68 is then rotated until the anti-rotation key 74 is aligned with keyway 24 of post 20. The inner tube 68 is then pushed downwardly until the lower end of inner tube 68 is positioned at the lower end of post 20.

The numeral 102 refers to a 60 ml blood sample syringe having a female luer 104 which is configured to be threaded onto the male luer 72 at the upper end of inner tube 68. The syringe 102 is filled with a blood sample mixture 106 containing a mixture of 41 ml whole blood and 9 ml of ACD-A. The blood sample mixture 106 is dispensed from syringe 102 into the outer tube 12 to the 50 ml fill line 26. The 60 ml syringe 102 is then unthreaded from the inner tube male luer 72. A biohazard safety luer cap 108 is then threaded onto the inner tube male luer 72.

The assembly 10 is then placed in a centrifuge and spun at 1900 rcf for approximately 8.5 minutes. The assembly 10 is then removed from the centrifuge. The technician, holding the device in a vertical position, removes the female luer cap 108 from the male luer 72 and threads a 10 ml syringe 110 onto the inner tube male luer 72 and visually locates the buffy coat layer 112. The technician slowly raises the inner tube 78 by grasping the male luer 72 and syringe connection until the lower (trailing) edge of the colored band 80 is visible and the buffy coat layer 112 and plasma 114 fractionation line 116. The technician then locks the inner tube lock assembly 82 by rotating the lock assembly 82 ninety degrees so that the chord tabs 98 engage the chords 58 and 60 which causes the body portion 92 to squeeze the inner tube 68 to lock the inner tube in the desired vertical position. The technician aspirates the desired volume into the syringe 110.

Figure 15:
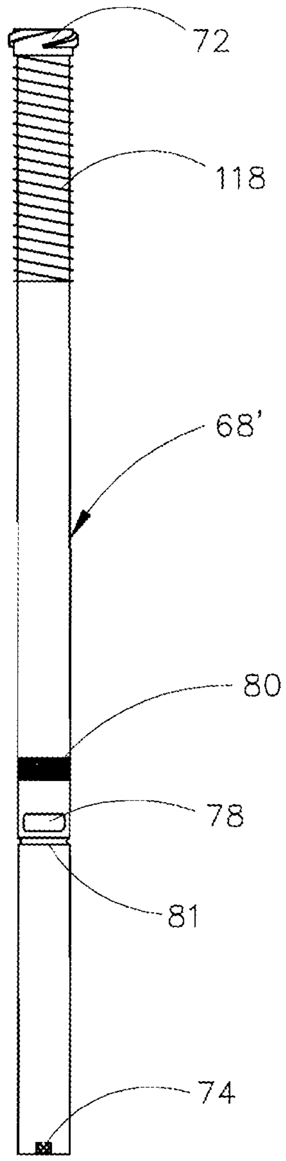
FIG. 15 is a side view of a modified inner tube with the cylindrical post being shown in section of the co-pending application.

FIG. 15 illustrates an optional design for the inner tube 68 and which is designated the numeral 68'. The only difference between inner tube 68' and inner tube 68 is that inner tube 68' has an externally threaded portion 118 below the male luer 72. All other features and functions of inner tube 68' are the same as inner tube 68.

Figure 17:
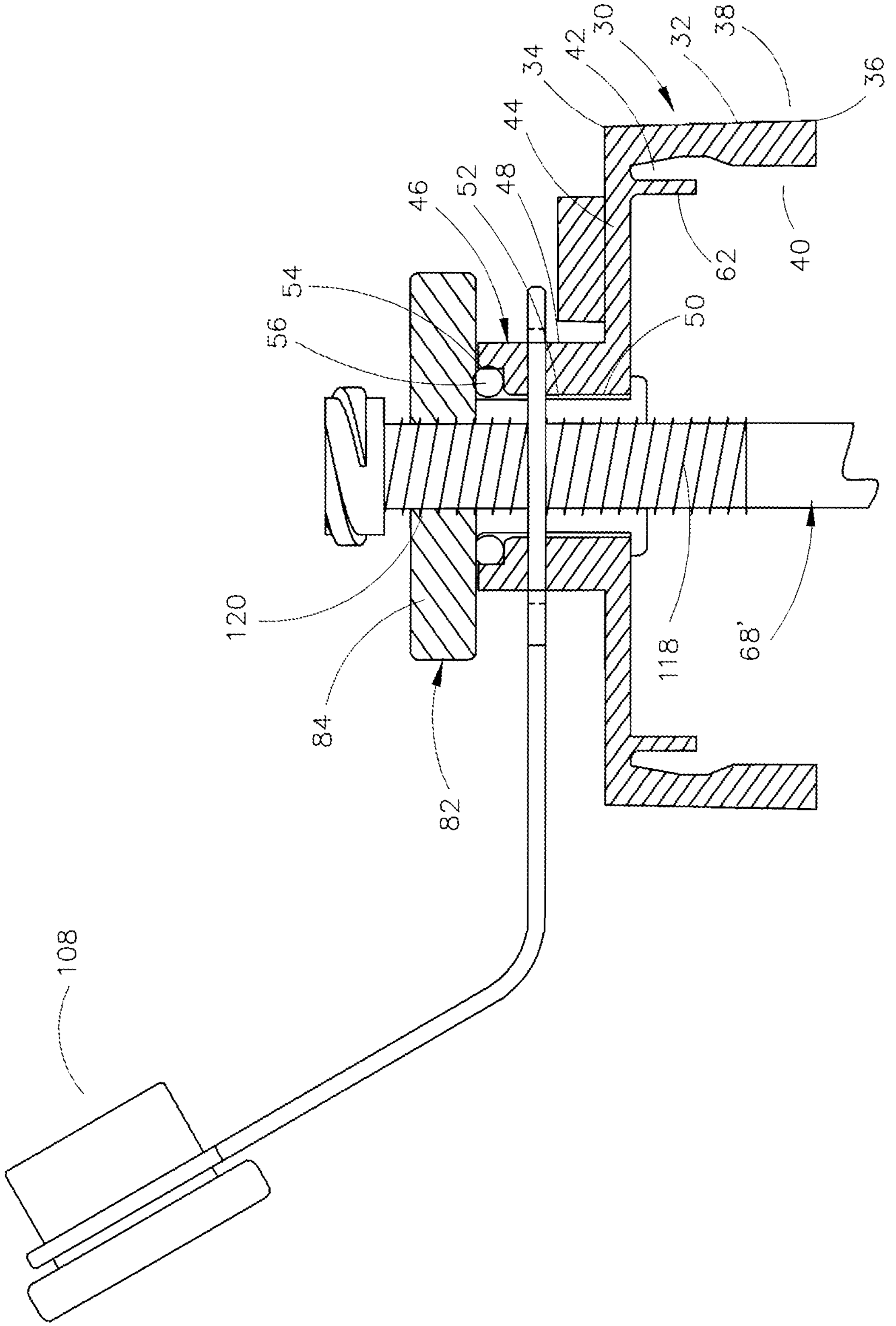
FIG. 17 is a partial sectional view which shows the modified form of the inner tube and a modified inner tube adjuster of the co-pending application.
Figure 19:
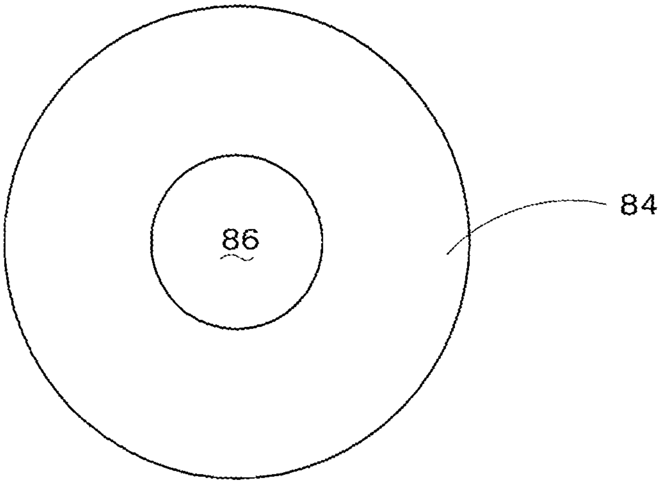
FIG. 19 is a top view of the locking disk of the inner tube lock of FIG. 18 of the co-pending application.
Figure 18:
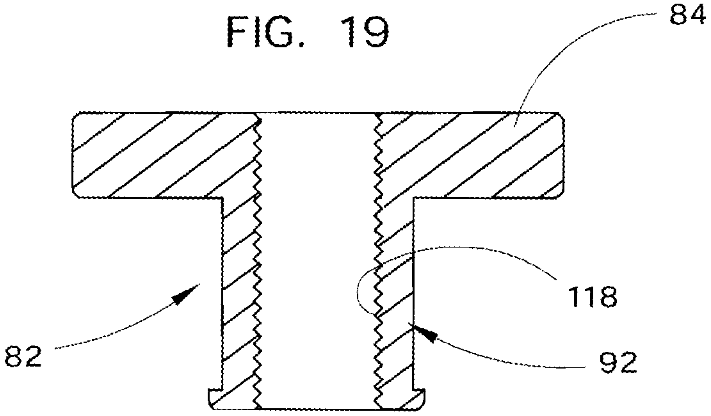
FIG. 18 is a sectional view of the body portion of the modified inner tube lock of the co-pending application.
Figure 20:
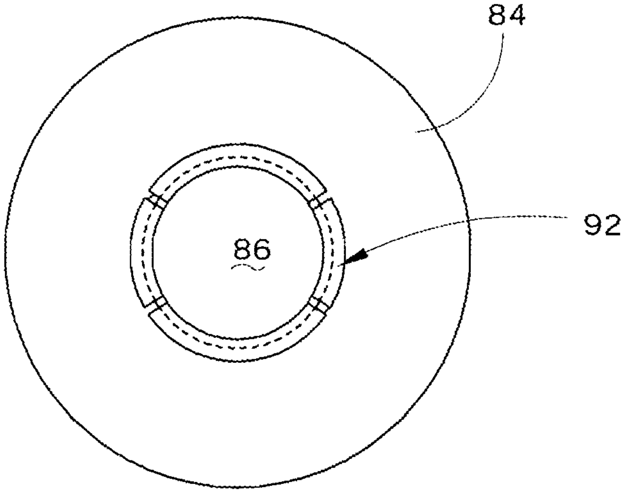
FIG. 20 is a bottom elevational view of the inner tube lock of FIG. 17 of the co-pending application.
Figure 21:
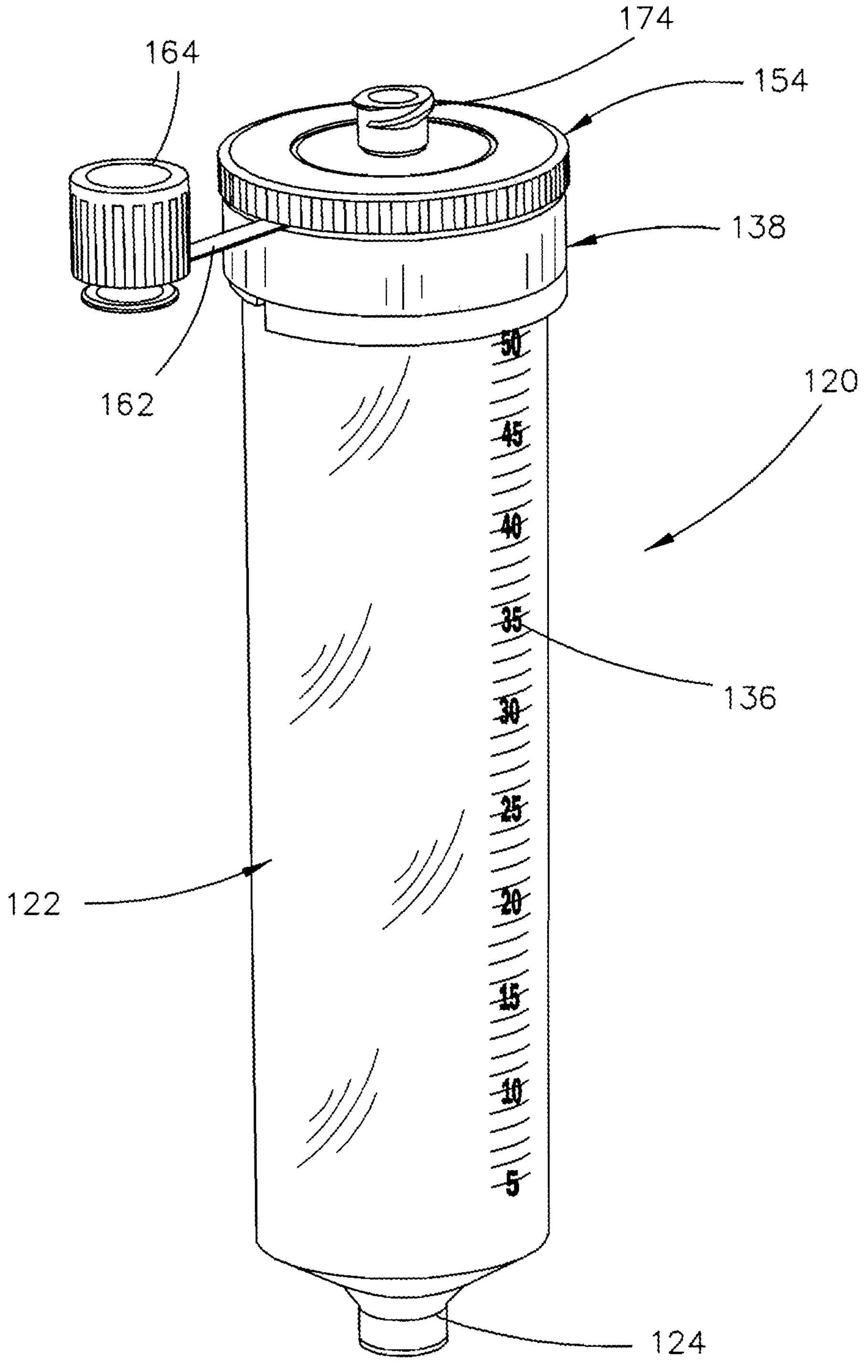
FIG. 21 is a perspective view of the centrifuge tube assembly of this invention.
Figure 22:
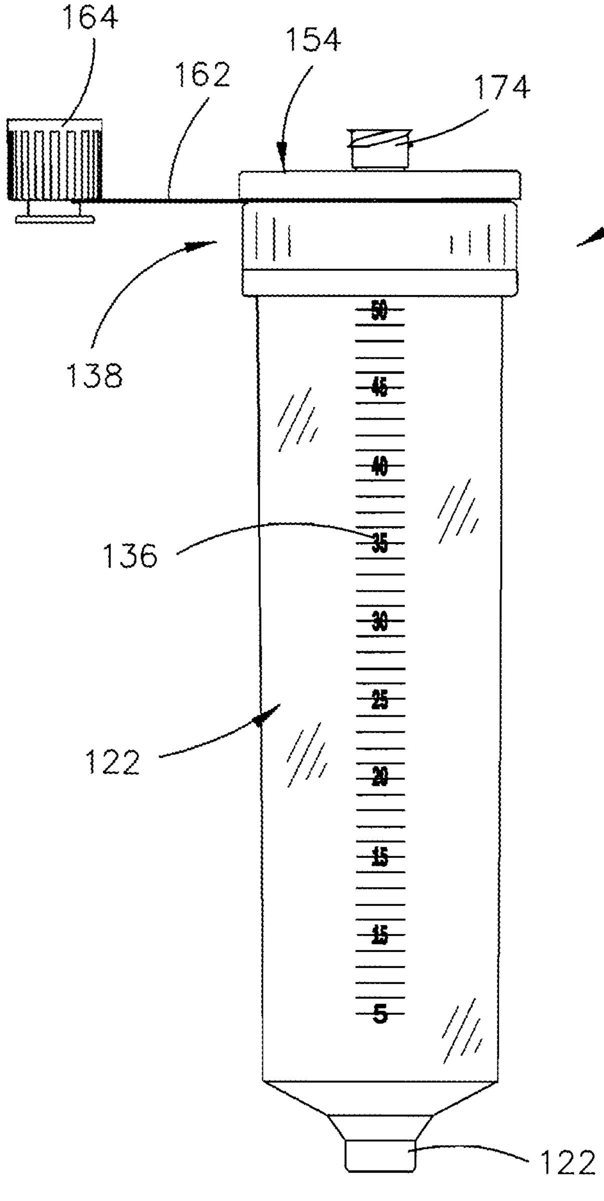
FIG. 22 is a side view of the centrifuge tube assembly of this invention.
Figure 23:
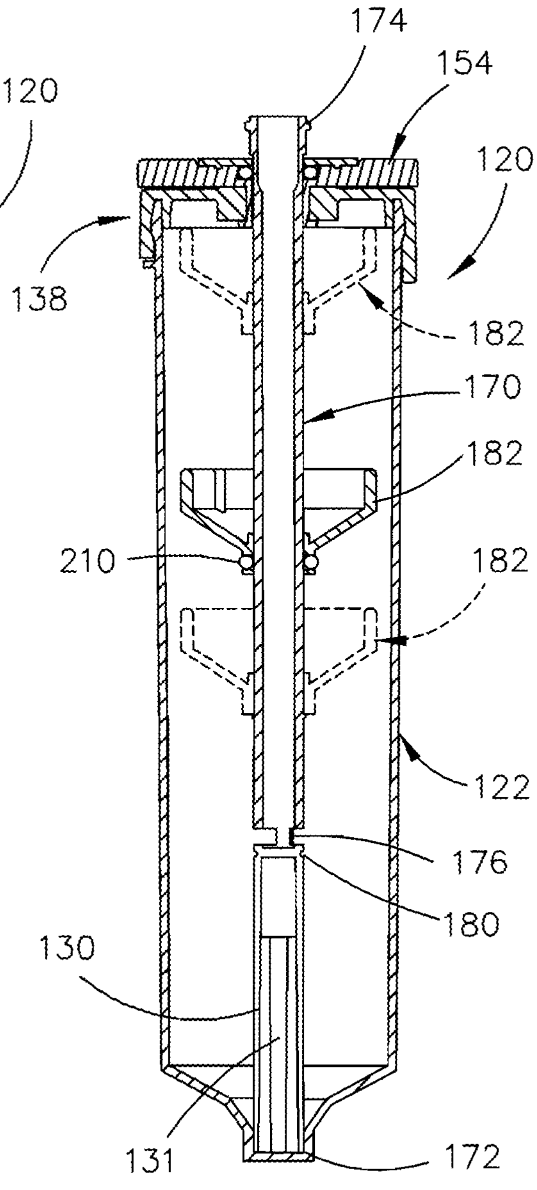
FIG. 23 is a sectional view of the centrifuge tube assembly of this invention which shows the disk assembly of this invention in its lower position in broken lines.
Figure 24:
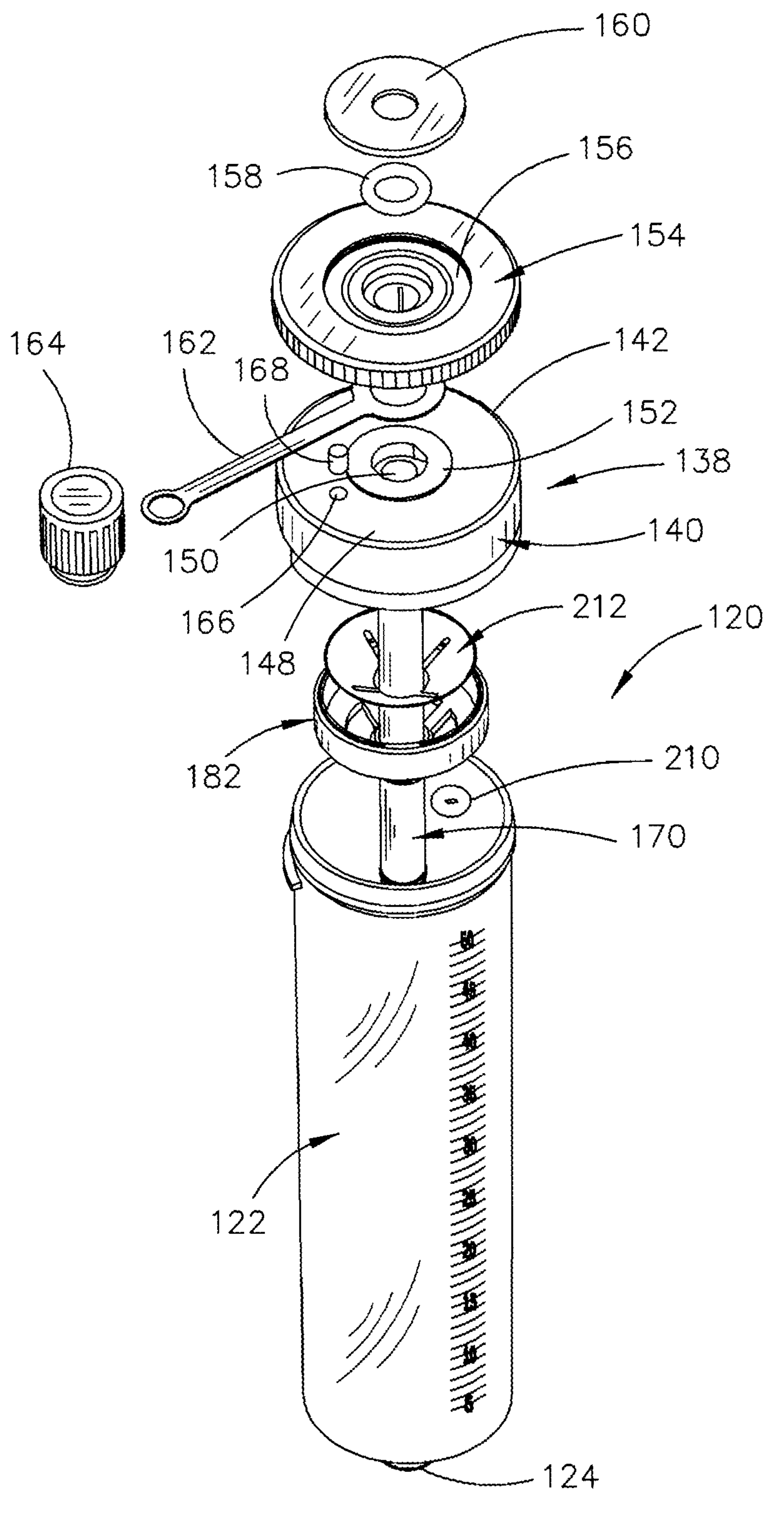
FIG. 24 is a partial exploded perspective view of the centrifuge tube assembly of this invention.
Figure 25:
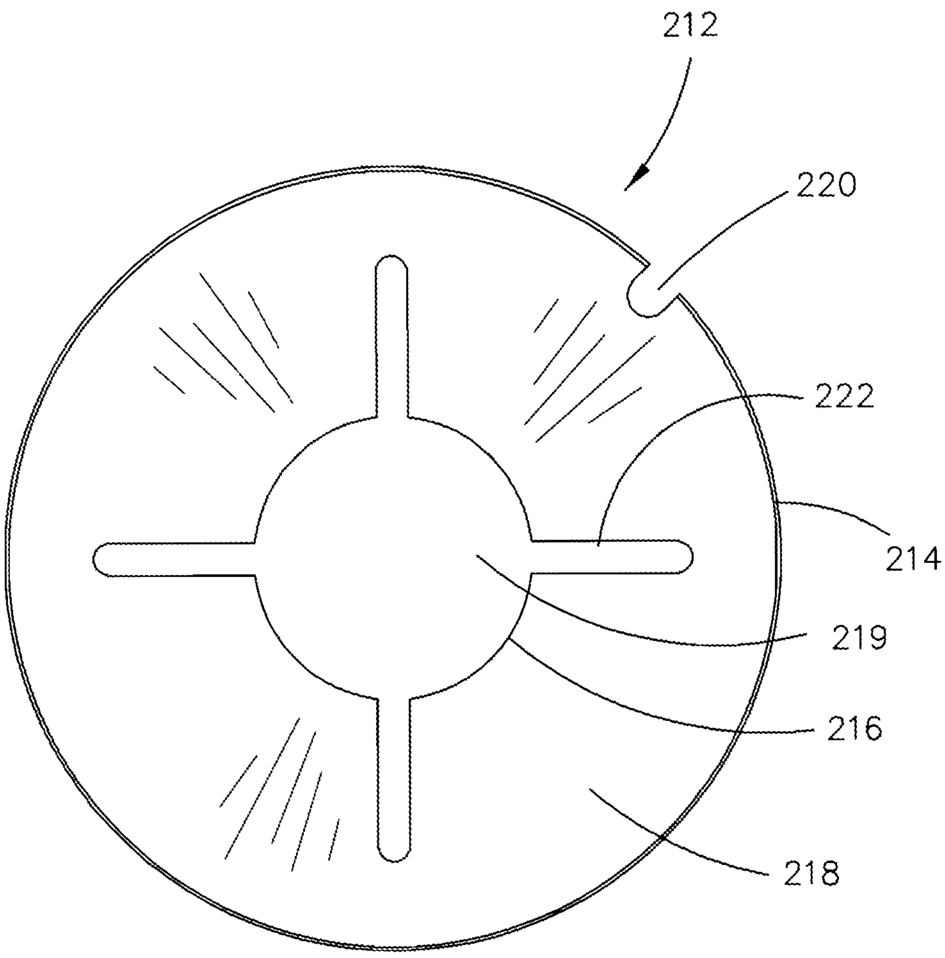
FIG. 25 is a top view of the flapper valve of the disk assembly of this invention.
Figure 26:
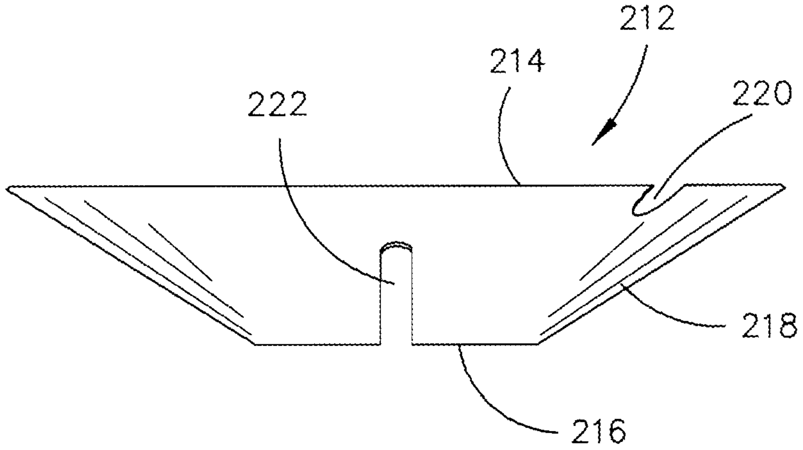
FIG. 26 is a side view of the flapper valve of the disk assembly of this invention.
Figure 27:
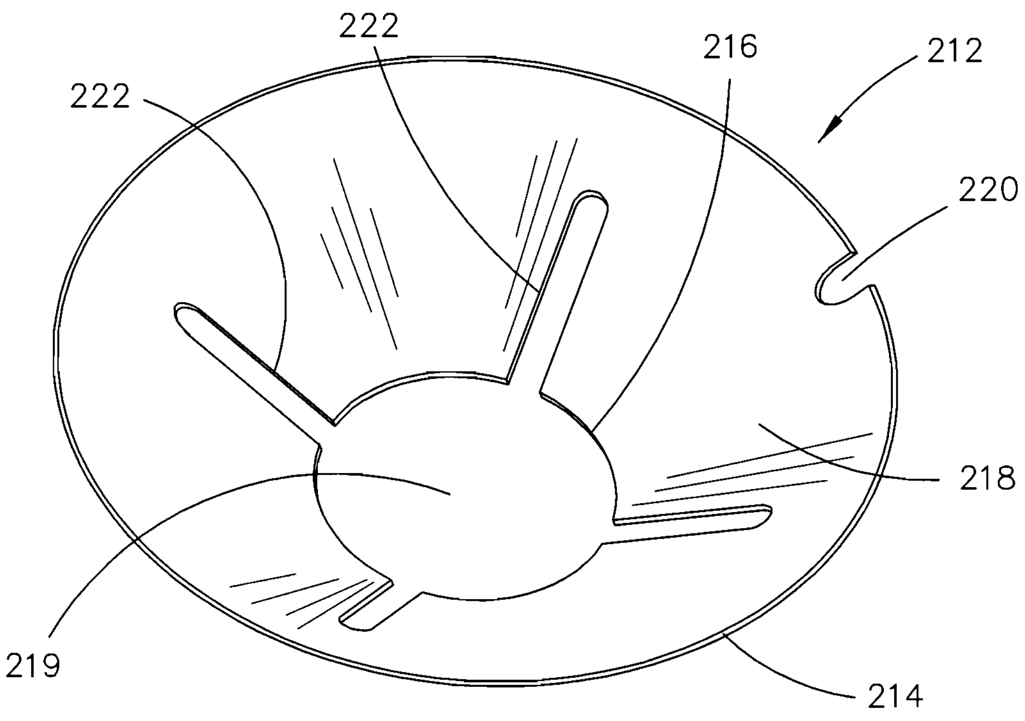
FIG. 27 is an upper perspective view of the flapper valve of the disk assembly of this invention.
Figure 28:
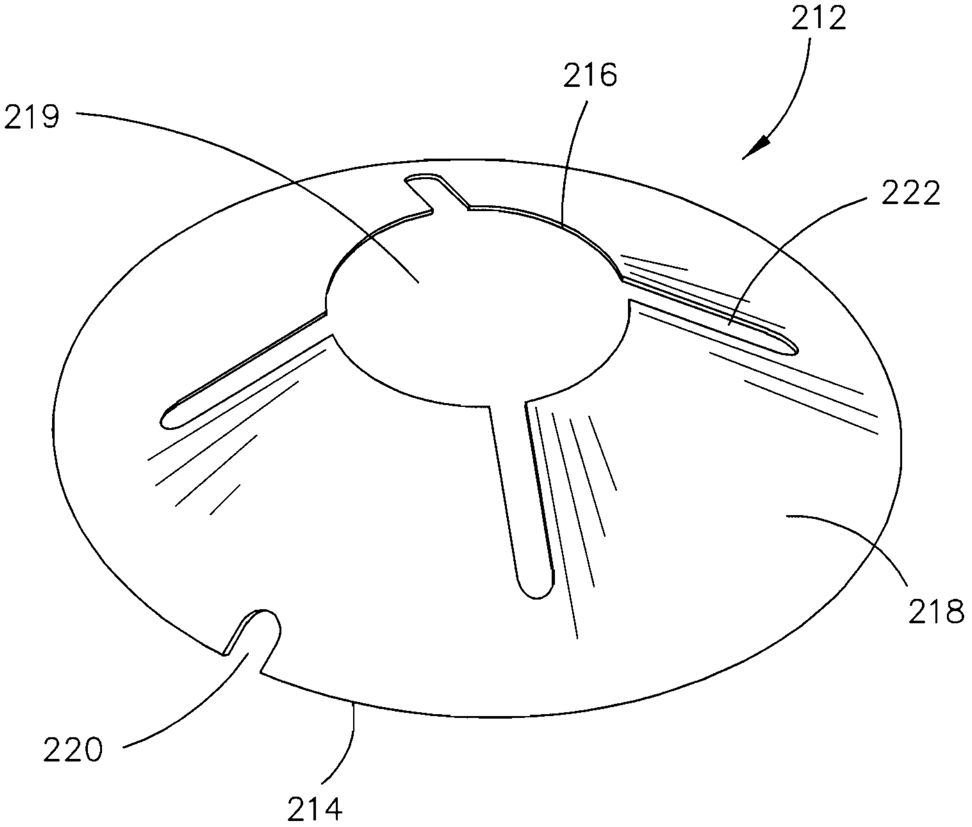
FIG. 28 is a bottom perspective view of the flapper valve of the disk assembly of this invention.
Figure 29:
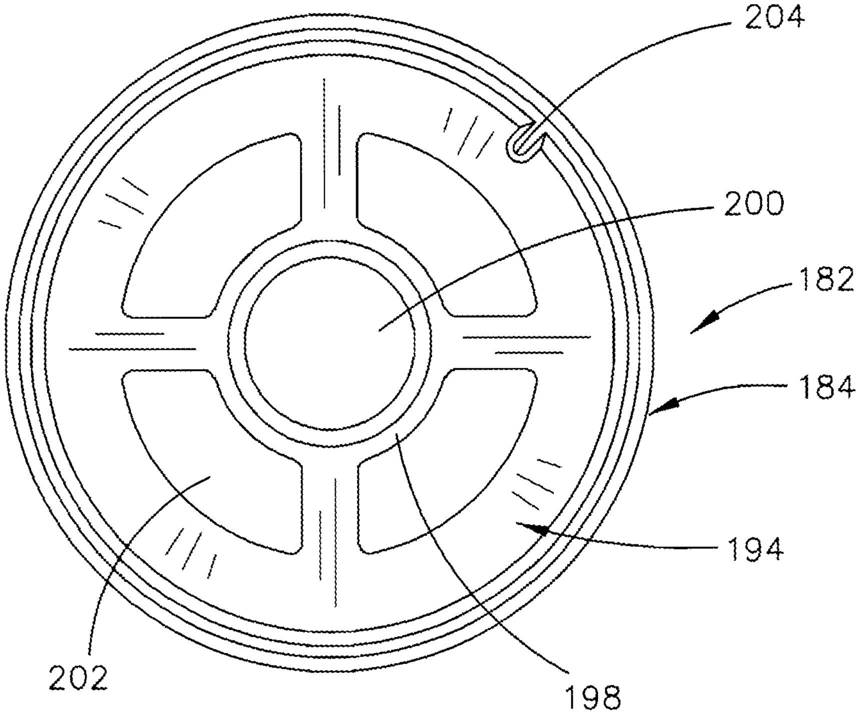
FIG. 29 is an upper view of the disk assembly of this invention.
Figure 30:
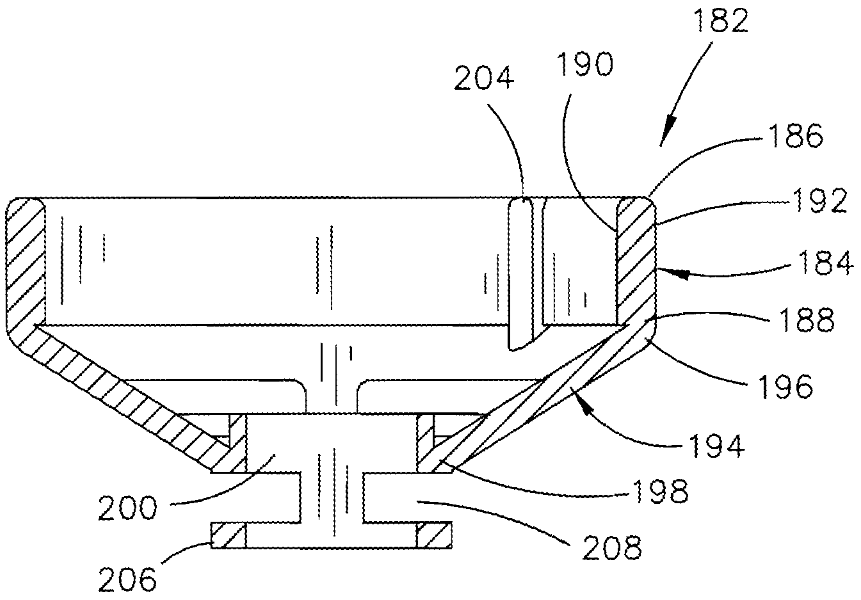
FIG. 30 is a sectional view of the disk assembly of this invention.
Figure 31:
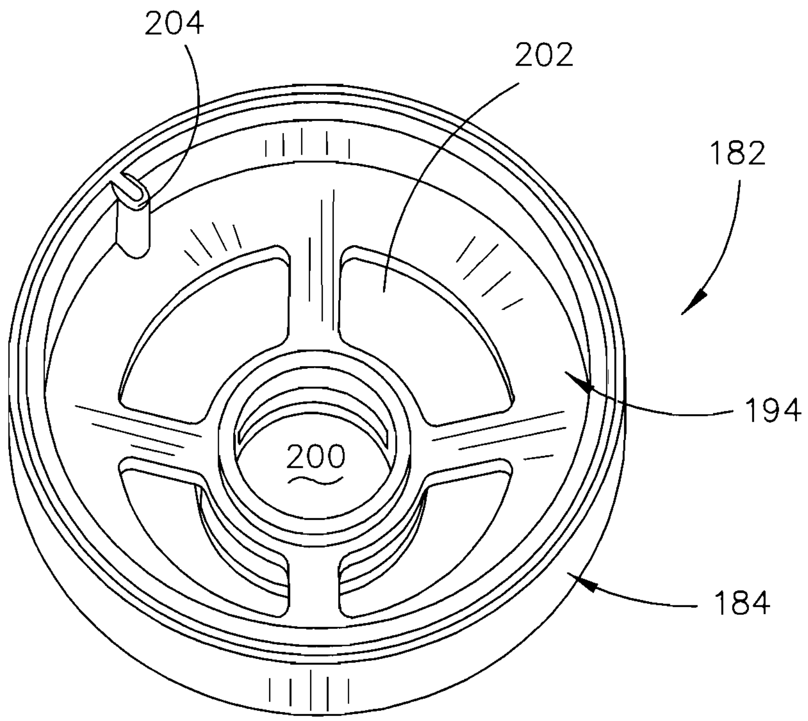
FIG. 31 is a top perspective view of the disk assembly of this invention.
Figure 32:
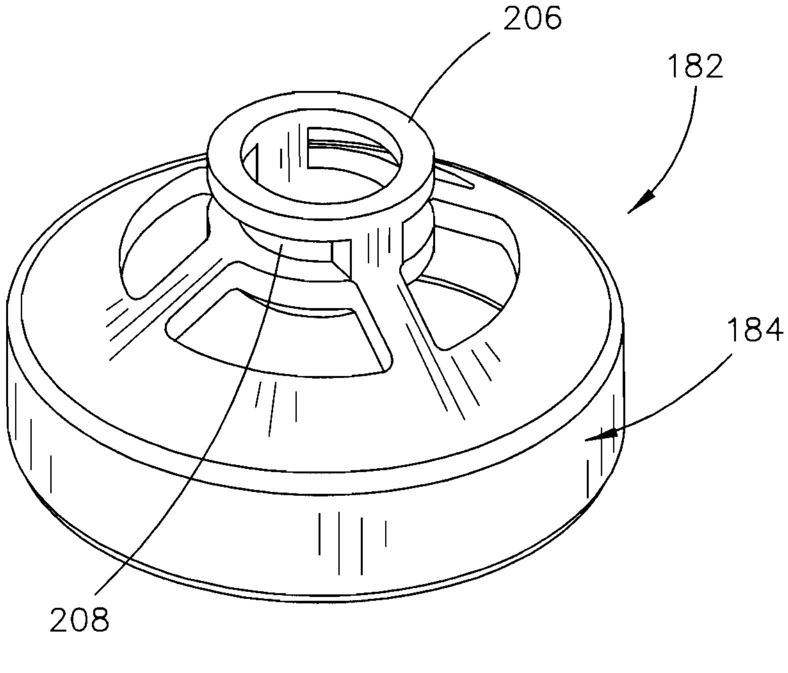
FIG. 32 is a bottom perspective view of the disk assembly of this invention.
Figure 33:
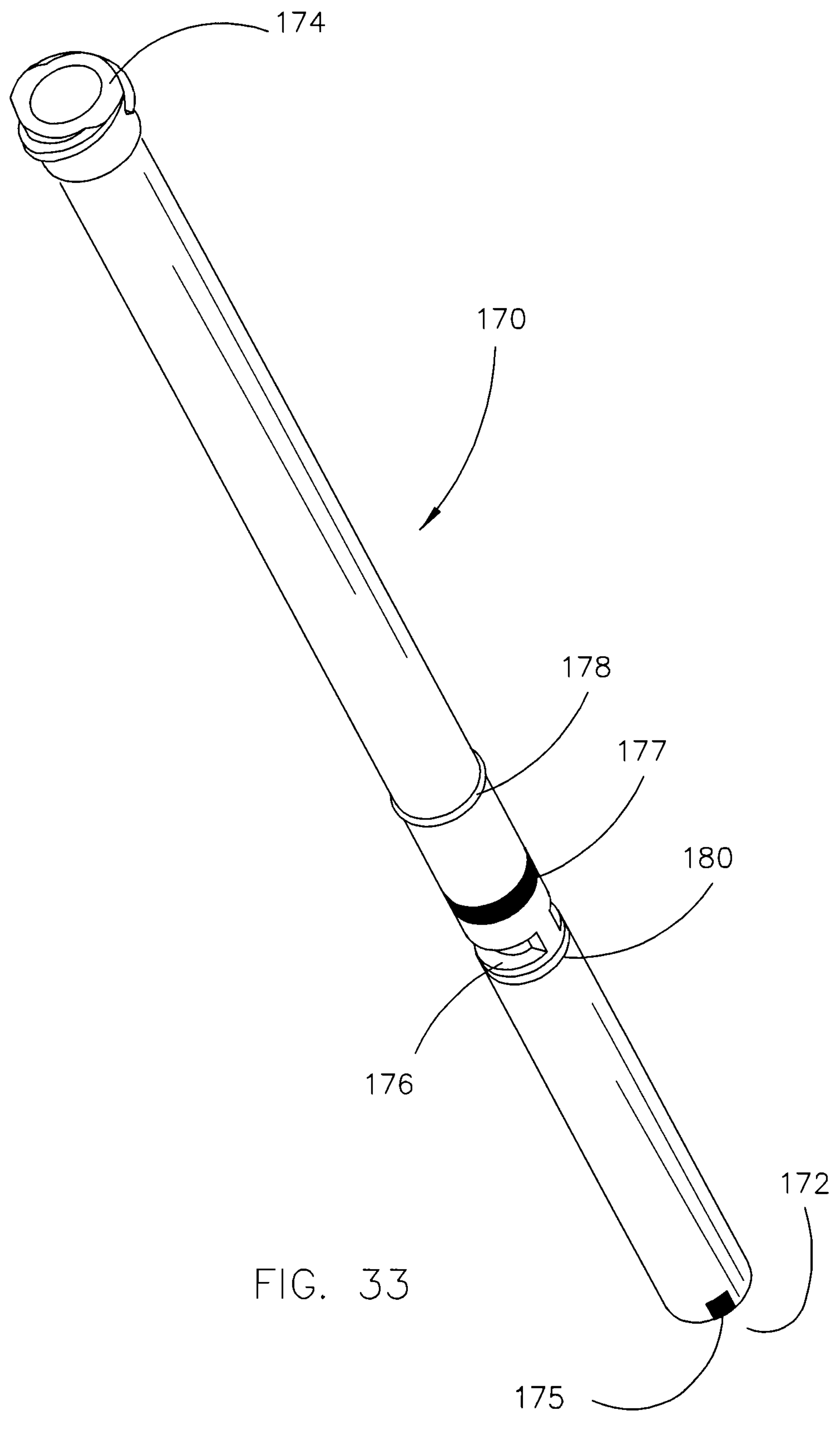
FIG. 33 is a perspective view of the inner tube of the centrifuge tube assembly of this invention.

FIG. 17 illustrates a modified method of vertically moving the inner tube 68'. Disk 84 and body portion 92 have internally threads 120 which threadably receive the threaded portion 118 of inner tube 68'. The O-ring 56 provides a seal at the mating point of the modified inner tube 68' and the threaded disk 84. The O-ring 56 provides a tactical feedback and surface friction between the threaded disk 84 and the cap 30 to secure the inner tube 68' in place.

The numeral 120 refers to the centrifuge tube assembly of the instant invention and which is illustrated in FIGS. 21-33, 34A, 34B, 34C and 35. Assembly 120 differs from assembly 10 by the addition of three important elements or structure. The assembly 120 includes a generally cone-shaped disk assembly, a flapper valve in the disk assembly, and an annular stop which extends outwardly from the inner tube of the assembly with the stop being positioned above the aspiration port of the inner tube. The cap of the assembly 120 is somewhat different than the cap 30 of assembly 10 but functions in the same way as the cap of the co-pending application. The above features will be described in detail hereinafter.

Assembly 120 includes an outer containment tube 122 having a tapered and closed lower end 124 and an upper end 126. The upper outer side of tube 122 has mating geometry in the form of a protruding annular bulge 128. An upstanding cylindrical post 130 is integrally formed with tube 122 and extends upwardly from lower end 124 into the interior 132 of tube 122. Post 130 has a vertically disposed keyway 133 formed therein. Tube 122 includes a stop 134 which protrudes laterally from the outer side of tube 122 below the upper end thereof. The exterior of tube 122 has millimeter indicia 136 imprinted thereon as seen in the drawings.

Assembly 120 also includes a cup-shaped cap 138 having a cylindrical side wall portion 140 with an upper end 142, a lower end 144, an inner side and an outer side. The upper inner side of side wall position 140 has an annular recessed portion 146 formed therein. Cap 138 includes top wall 148 which has a central opening 150 formed therein which has an inner tube support 152 positioned therein. The numeral 154 refers to an inner tube lock mechanism which has a recessed opening 156 formed therein. An O-ring 158 is positioned in opening 156 and is maintained therein by a retainer 160. A leur cap tether 162 has its inner end positioned between cap 138 and locking mechanism 154. Leur cap 164 is secured to the outer end of tether 162. The top wall 148 of cap 138 has a vent opening 166 which has a filter 168 positioned therein.

The assembly 120 also includes an elongated inner tube 170 having an open lower end 172 and an open upper end 174 in the form of a male luer. Inner tube 170 has an anti-rotating key 175 formed therein at its lower end which is configured to extend into the keyway 131 of post 136 such as in the co-pending application. Tube 170 has an aspiration port 176 formed therein above its lower end. Tube 170 has a colored band 177 formed thereon above aspiration port 176. Tube 170 also has an annular stop 178 which extends outwardly from inner tube 170 above aspiration port 176. The structure of inner tube 170 is identical to the structure of inner tube 68 except for the annular stop 178. Tube 170 also has an undercoat 180 formed in tube 170 below port 176.

Figure 35:
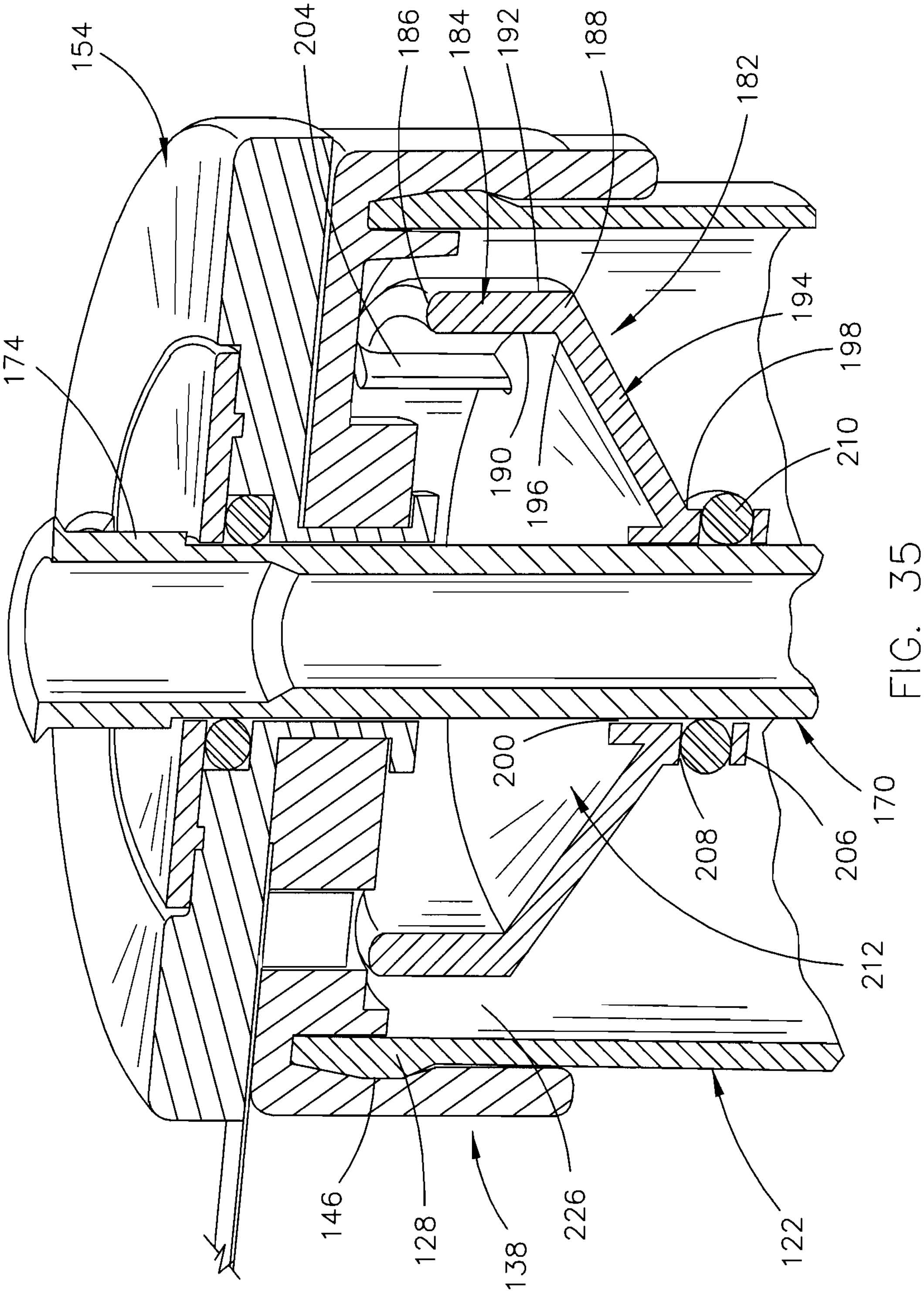
FIG. 35 is a partial perspective sectional view of the disk assembly of this invention in its upper position.

The numeral 182 refers to a generally cone-shaped disk assembly. Disk assembly 182 includes an upstanding ring-shaped wall 184 having an upper end 186, a lower end 188, an inner side 190 and an outer side 192. Disk assembly 182 also includes an inclined or conical-shaped wall 194 having an upper end 196 and a lower end 198 which defines an opening 200. Wall 194 includes a plurality of spaced-apart arc-shaped openings 202 formed therein. The inner side of wall 184 has a stop 204 formed therein. Disk assembly 182 has a cylindrical lower end portion 206 which extends downwardly from the lower end of wall 194 and which has an annular groove or recess 208 formed therein. An O-ring 210 is positioned in groove 208 as seen in FIG. 35.

The numeral 212 refers to a flexible plastic flapper valve which is positioned in disk assembly 182. As seen, the flapper valve 212 has a truncated conical-shape with an upper end 214, a lower end 216, an inclined side wall 218, and a central opening 219. The upper 214 of flapper valve 212 has a notch 220 formed thereto. The side wall 218 has a plurality of spaced-apart slits or slots 222 formed therein which extend upwards from the lower end 216 of flapper valve 212. The widths of the slits or slots 222 may vary depending on the viscosity of the material associated therewith as will be described hereinafter. Flapper valve 212 is positioned in disk 182 with the slits 222 being normally closed.

Figure 34C:
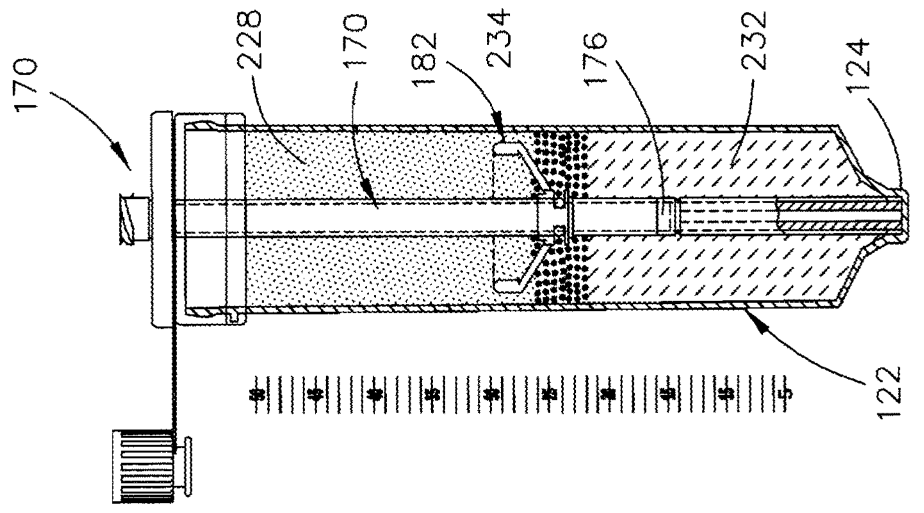
FIGS. 34A, 34B and 34C are sectional views of the centrifuge tube assembly of this invention which illustrate the position and operation of the disk assembly of this invention in a pre-spin position, a mid-spin position and a post-spin position respectively.
Figure 34B:
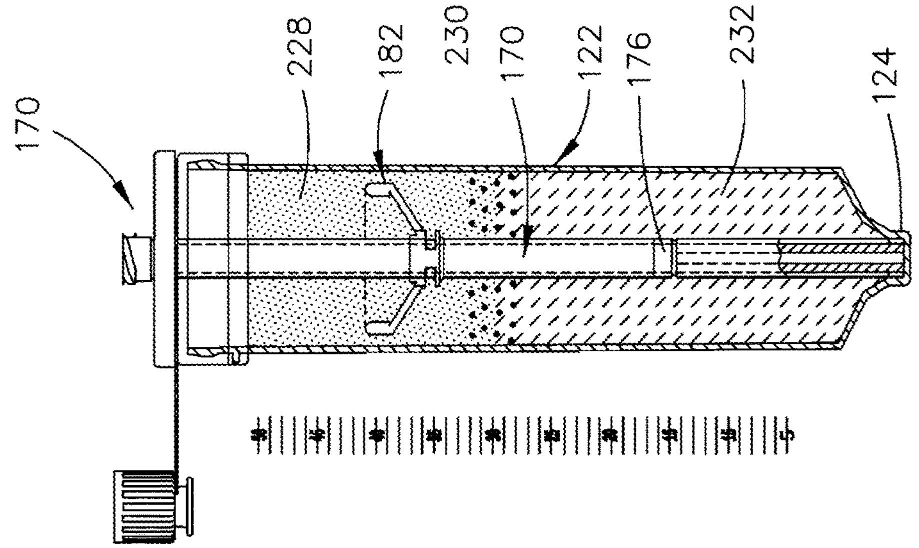
Figure 34A:
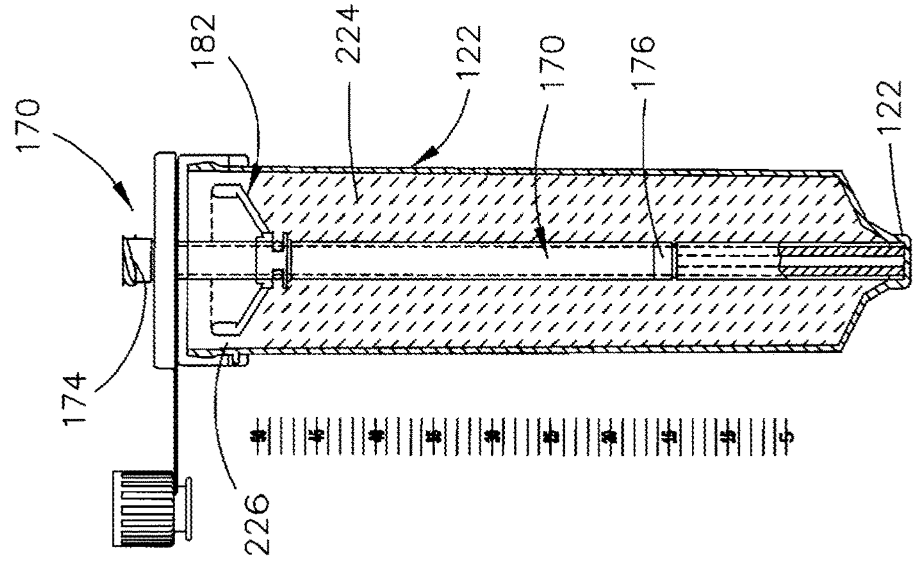

The centrifuge tube assembly 120 of the instant invention is assembled by first removing the cap 138 from the outer containment tube 122 if not already done so. The disk assembly 182 is then positioned below the cap 138. The inner tube lock mechanism 154 will be unlocked in an identical fashion as the inner tube lock assembly 82 as described above. The lower end 172 of inner tube 170 is pushed downwardly through the central opening 150 of cap 138. The lower end 172 of inner tube 170 is pushed downwardly through the central opening 219 of flapper valve 212, through the opening 200 in disk assembly 182 and through the O-ring 210. Initially, the disk assembly 182 will be positioned closely to the underside of cap 138 as seen in FIGS. 34A and 35. The O-ring 210 is in frictional engagement with the inner tube 170 to yieldably resist vertical movement of disk assembly 182 with respect to inner tube 170. The cap 138 will then be secured to the outer containment tube 122. The inner tube 170 is then rotated until the anti-rotation key 175 is aligned with keyway 135 of post 130. The inner tube 170 is then pushed downwardly until the lower end 172 of inner tube 170 is positioned at the lower end of post 130.

A 60 ml or less blood sample syringe such as syringe 102 of the co-pending patent application is employed. The syringe will have a female leur such as female leur 104 in the co-pending application. The female leur is then threaded onto the male leur 174 of inner tube 170. The syringe is filled with a blood sample mixture 224 containing a mixture of 41 ml whole blood and 9 ml of ACD-A. The blood sample could be larger or smaller. The blood mixture 224 is dispensed from the syringe into the outer containment tube 122 to the 50 ml line of indicia 136. The 60 ml syringe is then unthreaded from the inner tube male leur 174. The biohazard safety leur cap 164 is then threaded onto the inner tube male leur 174. The lock mechanism 154 is then locked in the same manner as in the co-pending application.

FIG. 34A illustrates the blood sample mixture 224 in the outer containment tube 122. FIG. 34A illustrates that the disk assembly 182 is in its upper pre-spin position. As seen, the outer diameter of the wall 184 of disk assembly 182 is less than the inside diameter of outer containment tube 122 to create a gap 226 therebetween.

The centrifuge tube assembly 120 is then placed in a centrifuge and spun at 1900 rcf for approximately 30 minutes. FIG. 34B illustrates the components of the blood sample and the position of the disk assembly 120 at mid-spin. FIG. 34C illustrates the component of the blood sample and the position of the disk assembly 120 at the finished spin or past spin. In FIG. 34B, the numeral 228 refers to the plasma component of the blood sample with the numeral 230 referring to buffy coat and the numeral 232 referring to the red cells. In FIG. 34C, the numeral 234 refers to the packed platelets.

As the centrifuge process takes place, a fractionation takes place with the plasma 228, being the lightest component in density, moves towards the cap 138. The platelets/white cells, being the second latest component in density also moves towards the cap 138 behind the plasma 228. The red cells, being the heaviest component in density and the most in volume, collect at the bottom of the tube. The fractionated packed red cells remain firm and resistant to movement. Changing the rcf and spin time will directly affect the quality of fractionation.

Increasing the spin time and rcf can remix the components. During the fractionation process, the disk assembly 182, which has the same density by volume as the red cells, moves in the direction of the red cells. The O-ring 210 contacts against the inner tube OD and slows down the downward movement of disk assembly 182 allowing the blood components to develop a quality fractionation. The plasma is moved upwardly around the disk assembly 182 by way of the gap 226 and through the slits of 222 of the disk assembly 182. The centrifugal force of the centrifugation process causes the disk assembly 182 to move downwardly on the inner tube 172. Near the end of the spin time, the disk assembly 182 will reach the inner tube stop 178 on the inner tube 170 thereby trapping the platelets/white cells and red cells therebelow. The disk assembly 182 creates a chamber between the platelets/white cells and red cells that limits in-flow to the disk assembly outside diameter. The in-flow gap 226 is dimensioned to maintain an even plasma in-flow characteristic as the platelets/white cell fractionation is being aspirated.

The centrifuge tube assembly 120 is then removed from the centrifuge. The technician, holding the assembly in a vertical position, moves the female leur cap 164 from the male leur 174 and threads a 10 ml syringe onto the inner tube male leur 174 and visually locates the buffer coat layer 230. The technician slowly raises the inner tube 170 by grasping the male leur 174 and syringe connection until the lower (trailing) edge of the colored band 177 is visible and the buffy coat layer 230 and plasma 228. The technician then locks the inner tube lock assembly 154 by rotating the lock assembly 154 90 degrees so that the inner tube 170 is locked in place in the same manner as described above in the co-pending application. Although the lock assembly 154 has a different appearance than the lock assembly 82 of the co-pending application, they function in an identical manner. The technician then aspirates the desired volume into the syringe.

Thus it can be seen that an improved centrifuge tube assembly has been provided which accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A centrifuge tube assembly, comprising:

an elongated and vertically disposed outer containment tube having an upper end and a lower end;

an elongated and vertically disposed inner tube, having an open lower end and an open upper end, positioned in said outer containment tube;

said inner tube having an aspiration port formed therein above said lower end thereof;

a cup-shaped cap selectively removably mounted on said upper end of said outer containment tube;

a generally cone-shaped disk assembly, having open upper and lower ends, vertically slidably mounted on said inner tube to create a chamber which captures blood components at their fractionation level;

said disk assembly having a generally cone-shaped cavity extending downwardly into said upper end of said disk assembly, and a cone-shaped flapper valve positioned in cone-shaped cavity of said disk assembly.

2. The centrifuge tube assembly of claim 1 wherein said cone-shaped flapper valve has a plurality of slits formed therein.

3. The centrifuge tube assembly of claim 1 wherein said open upper end of said cone-shaped disk assembly has an outer diameter which is less than the inner diameter of said outer confinement tube to provide a ring-shaped gap therebetween.

* * * * *